(12) United States Patent
Shiratori et al.

(10) Patent No.: US 8,786,680 B2
(45) Date of Patent: Jul. 22, 2014

(54) MOTION CAPTURE FROM BODY MOUNTED CAMERAS

(75) Inventors: Takaaki Shiratori, Pittsburgh, PA (US);
Hyun Soo Park, Pittsburgh, PA (US);
Leonid Sigal, Pittsburgh, PA (US);
Yaser Sheikh, Pittsburgh, PA (US);
Jessica K. Hodgins, Pittsburgh, PA (US)

(73) Assignees: Disney Enterprises, Inc., Burbank, CA (US); Carnegie Mellon University, Pittsburgh, PA (US)

( * ) Notice: Subject to any disclaimer, the term of this patent is extended or adjusted under 35 U.S.C. 154(b) by 449 days.

(21) Appl. No.: 13/165,619

(22) Filed: Jun. 21, 2011

(65) Prior Publication Data

US 2012/0327194 A1 Dec. 27, 2012

(51) Int. Cl.
*G09G 5/00* (2006.01)
*H04N 7/18* (2006.01)

(52) U.S. Cl.
USPC ............. 348/47; 348/154; 348/143; 345/156; 345/473

(58) Field of Classification Search
CPC ........ G09G 5/00; H04N 7/18; H04N 13/0239
See application file for complete search history.

(56) References Cited

U.S. PATENT DOCUMENTS

| 2010/0164862 | A1* | 7/2010 | Sullivan et al. | 345/156 |
| 2010/0225758 | A1* | 9/2010 | Mashiah | 348/143 |
| 2011/0241984 | A1* | 10/2011 | Morrison et al. | 345/157 |

OTHER PUBLICATIONS

Agarwal, Sameer et al.; "Building Rome in a Day"; 2009, *University of Washington*, 8 pages.
Ballan, Luca et al; "Unstructured Video-Based Rendering: Interactive Exploration of Casually Captured Videos"; 2010, *ETH Zurich*, 10 pages.
Cheung, German K.M. et al.; "Shape-From-Silhouette of Articulated Objects and its Use for Human Body Kinematics Estimation and Motion Capture";2003, *Robotics Institute, Carnegie Mellon University*, 8 pages.
Corazza, Stefano et al.; "Automatic Generation of a Subject Specific Model for Accurate Markerless Motion Capture and Biomechanical Applications";2006, *Stanford University*, 2 pages.
Corazza, Stefano et al.; "A Markerless Motion Capture System to Study Musculoskeletal Biomechanics: Visual Hull and Simulated Annealing Approach"; 2006, *Annals of Biomedical Engineering*, vol. 34, No. 6, pp. 1019-1029.
Davison, A. et al.; "MonoSLAM: Real-time single camera SLAM"; 2007, *IEEE Transactions on Pattern Analysis and Machine Intelligence*, vol. 29, No. 6, pp. 1052-1067.
Deutscher, Jonathan et al.; "Articulated Body Motion Capture by Stochastic Search"; 2005, *University of Oxford*, 33 pages.
Devernay, Frederic et al.; "Straight lines have to be straight"; 2001, *Machine Vision and Applications*, vol. 13, pp. 14-24.

(Continued)

*Primary Examiner* — Chikaodili E Anyikire
*Assistant Examiner* — Maryam Nasri
(74) *Attorney, Agent, or Firm* — Kilpatrick Townsend & Stockton LLP

(57) ABSTRACT

Body-mounted cameras are used to accurately reconstruct the motion of a subject. Outward-looking cameras are attached to the limbs of the subject, and the joint angles and root pose that define the subject's configuration are estimated through a non-linear optimization, which can incorporate image matching error and temporal continuity of motion. Instrumentation of the environment is not required, allowing for motion capture over extended areas and in outdoor settings.

20 Claims, 12 Drawing Sheets

(56) References Cited

OTHER PUBLICATIONS

Fischler, Martin A. et al.; "Random Sample Consensus: A Paradigm for Model Fitting with Applications to Image Analysis and Automated Cartography"; 1981, *Communications of the ACM*, vol. 24, No. 6, pp. 381-395.

Frahm, Jan-Michael et al.; "Building Rome on a Cloudless Day"; 2010, http://royal.pingdom.com/2010/01/22/internet-2009-in-numbers, 14 pages.

Hasler, Nils et al.; Markerless Motion Capture with Unsynchronized Moving Cameras; 2009, http://www.tnt.uni-hannover.de/staff/rosenhahn/, 8 pages.

Kelly, Philip et al.; "Human Motion Reconstruction using Wearable Accelerometers"; 2010, ACM SIGGRAPH Symposium on Computer Animation, 2 pages.

Klein, Georg et al.; "Parallel Tracking and Mapping for Small AR Workspaces"; 2007, *Department of Engineering Science, University of Oxford*, 10 pages.

Lepetit, Vincent et al.; "EPηP: An Accurate O(n) Solution to the PηP Problem"; 2009, *Computer Vision Laboratory, Ecole Polytechnique Federale de Lausanne*, 13 pages.

Lourakis, Manolis I.A. et al.; "SBA: A Software Package for Generic Sparse Bundle Adjustment"; 2009, *ACM Trans. Math. Softw.*, vol. 1, Article 2, pp. 2:1-2:30.

Lowe, David G.; "Distinctive Image Features from Scale-Invariant Keypoints"; 2004, *International Journal of Computer Vision*, vol. 60, No. 2, pp. 91-110.

Moeslund, Thomas B. et al.; "A survey of advances in vision-based huan motion capture and analysis"; 2006, *Computer Vision and Image Understanding*, vol. 104, pp. 90-126.

Muja, Marius et al.; "Fast Approximate Nearest Neighbors with Automatic Algorithm Configuration"; 2009, *Computer Science Department, University of British Columbia*, 10 pages.

Nister, David et al.; "Visual Odometry for Ground Vehicle Applications"; 2006, *Sarnoff Corporation*, 35 pages.

O'Brien, James F. et al.; "Automatic Joint Parameter Estimation from Magnetic Motion Capture Data"; 2000, *College of Computing and Graphics, Visualization and Usuability Center, Georgia Institute of Technology*, pp. 1-8.

Oskiper, Taragay et al.; "Visual Odometry System Using Multiple Stereo Cameras and Inertial Measurement Unit"; 2007, *IEEE*, 8 pages.

Pollefeys, Marc; "Visual Modeling with a Hand-Held Camera"; 2004, *International Journal of Computer Vision*, vol. 59, No. 3, pp. 207-232.

Raskar, Ramesh et al.; "Prakash: Lighting Aware Motion Capture using Photosensing Markers and Multiplexed Illuminators"; 2007, Mitsubishi Electric Research Laboratories, 11 pages.

Schwarz, Loren A. et al.; "Multiple-Activity Human Body Tracking in Unconstrained Environments"; 2010, *Computer Aided Medical Procedures, Technische Universitat*, 10 pages.

Slyper, Ronit et al.; "Action Capture with Accelerometers"; 2008, *Eurographics/ ACM SIGGRAPH Symposium on Computer Animation*, 7 pages.

Snavely, Noah et al.; "Photo Tourism: Exploring Photo Collections in 3D"; 2006, *University of Washington*, 12 pages.

Tautges, Jochen et al.; "Motion Reconstruction Using Sparse Accelerometer Data"; 2011, *ACM*, 12 pages.

Vlasic, Daniel et al.; "Practical Motion Capture in Everyday Surroundings"; 2007, *Computer Science and Artificial Intelligence Laboratory, Massachusetts Institute of Technology*, 9 pages.

Welch, Greg et al.; "The HiBall Tracker: High-Performance Wide-Area Tracking for Virtual and Augmented Environments"; 1999, *Symposium on Virtual Reality Software and Technology*, 11 pages.

Welch, Greg et al.; "Motion Tracking: No Silver Bullet, but a Respectable Arsenal"; 2002, *IEEE Computer Graphics and Applications*, pp. 24-38.

Xie, Liguang et al.; "Data-driven Motion Estimation with Low-Cost Sensors"; 2008, *The Institute of Engineering and Technology*, pp. 600-605.

Zhang, Zhiqiang et al.; "Ubiquitous Human Body Motion Capture using Micro-sensors"; 2009, *Chinese Academy of Sciences*, 5 pages.

Zhu, Zhiwei et al. "Ten-fold Improvement in Visual Odometry Using Landmark Matching"; 2007, *Sarnoff Corporation*, 8 pages.

Zhu, Zhiwei et al. "Real-Time Global Localization with a Pre-Built Visual Landmark Database"; 2008, *Sarnoff Corporation*, 8 pages.

\* cited by examiner

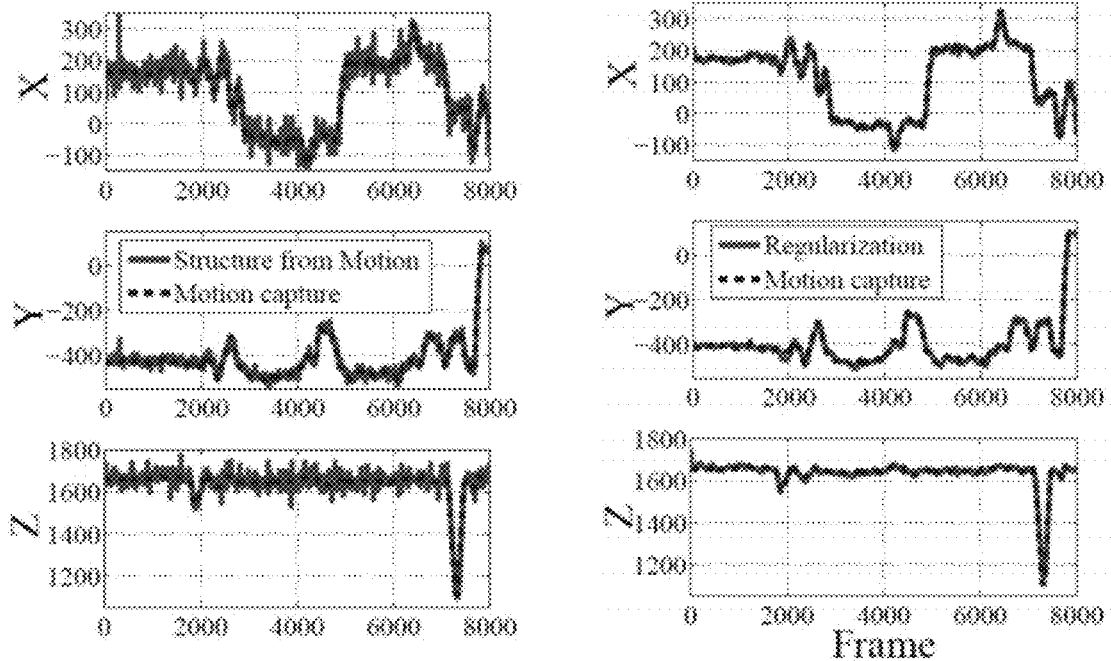
*FIG. 15A*  *FIG. 15B*
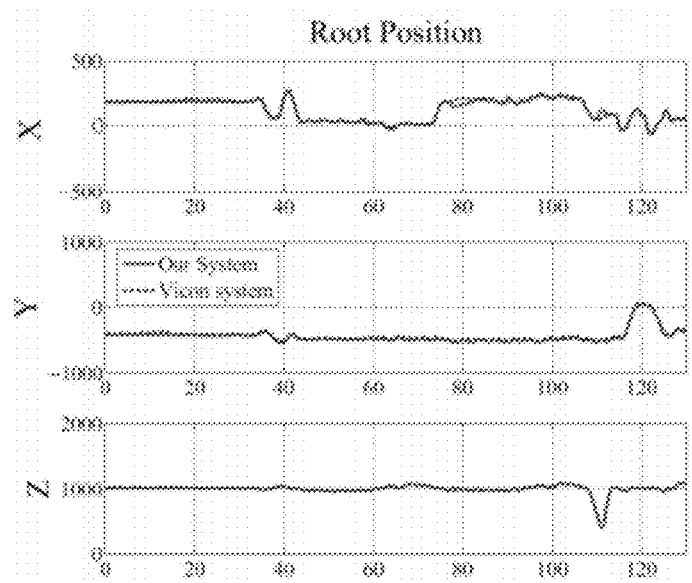
*FIG. 16A*

MOTION CAPTURE FROM BODY MOUNTED CAMERAS

BACKGROUND

The present disclosure relates generally to motion capture and in particular to motion capture using body-mounted cameras.

Motion capture refers generally to techniques for modeling movement of a body during a specific activity (e.g., running, jumping, dancing) starting from observation of an actual subject performing the activity to be modeled. These activities usually involve coordinated movements of the subject's limbs, head, and/or other body parts. In a traditional marker-based optical motion capture system, the subject wears a special suit that incorporates retroreflective or light-emitting markers at particular points on the subject's body (e.g., near the joints or at specific points on the limbs, torso, or head). Cameras set up at various locations around the subject record the movement of the subject as the subject performs the desired activity; for three-dimensional (3D) modeling, multiple cameras need to be observing the subject at any given time. Triangulation is used to recover the 3D position of these markers in space, and the 3D marker positions, in turn, are used to fit a skeletal model to the observed motion. Animated characters (which might or might not look like the original subject) can then be rendered from the skeleton.

While such systems can produce highly accurate results, they are generally expensive and also limiting as to where motion can be captured. Reliable identification of the markers requires controlled lighting and generally is only possible indoors. Further, since the cameras generally do not move, a large number of cameras may be required if the motion takes place over a large area.

For less intrusive motion capture, "marker-less" methods have been proposed. Marker-less methods most often use regular video cameras with simple (e.g., chromakey) backgrounds to reconstruct a voxel representation of the body over time and then fit a skeletal model to the voxel representations. Recent studies [Corazza, S. et al., *Analysis Biomedical Engineering* 34, 6, 1019-1029 (2006); Corazza, S. et al., *IEEE Transactions on Biomedical Engineering* 57, 4, 806-812 (2010)] suggest that with a sufficient number of cameras and favorable imaging conditions, the accuracy of marker-less methods can rival that of traditional optical motion capture. As with optical motion capture, however, these systems generally require costly setups with many synchronized video cameras.

Both marker-based and marker-less systems can be classified as "outside-in," in that they both rely on sensors mounted in the environment and passive, if any, markers on the body. By definition, this requirement restricts their use to laboratory environments or closed stage settings because the capture space has to be instrumented with the sensors. This also restricts the size of the space where the capture can take place.

Another class of motion-capture systems uses an "inside-out" approach, relying on sensors on the body to recover the 3D pose. This allows for increased portability, including use in outdoor spaces.

One example of an inside-out system, developed by Raskar and colleagues [Raskar, R. et al., *ACM SIGGRAPH* (2007)], uses photo sensors worn by the subject as active markers. Raskar's system relies on measuring the spatio-temporal light modulations produced by multiple LED transmitters placed in the environment that emit Gray-coded patterns. The subject wears receiver modules equipped with RGB photo sensors, which are tasked with decoding (demultiplexing) the observed patterns and thereby directly determining the 3D spatial location of the subject. This system, however, still requires transmitters in the environment, making it only marginally more portable than more traditional optical motion capture setups.

Another type of inside-out system relies on an electromechanical exoskeleton suit worn by the subject. The suit includes embedded lightweight rods that articulate with the subject's bones. Potentiometers at the joints measure the angular rotation of the rods, and the measured rotations are converted to joint angles using calibration data. Such systems, while directly capable of measuring the motion of the subject, are intrusive and uncomfortable to wear, particularly for extended motion capture sessions.

Still other examples of inside-out techniques rely on other types of sensors worn by the subject. Various sensors have been used, including ultrasound, inertial measuring units (IMUs), and tri-axial accelerometers. Inertial motion capture systems measure the rotation of body parts in the world using accelerometers and gyroscopes. These systems are portable and can be taken outside; however, they are only able to measure the orientations of body parts, not the motion of the body in the world. In addition, they often suffer from substantial drift over time, making them practical only for capturing relatively short motions.

SUMMARY

Embodiments of the present invention provide motion capture techniques using body-mounted cameras worn by the subject whose motion is being captured. Outward-looking cameras are attached to the body of the subject, and the joint angles and root pose that define the subject's configuration are estimated through a non-linear optimization, which can incorporate image matching error and temporal continuity of motion. The system can be used in situations where image capture would be difficult or impossible with traditional motion capture systems, including extended walking outside and swinging on monkey bars.

In some embodiments, the use of outward-looking cameras allows reconstruction of the relative and the global motion of a subject outside of a laboratory or closed stage. The cameras can be worn on casual clothing, can be easily mounted and removed using Velcro attachments, and can be compact and lightweight enough to allow unimpeded movement. Structure from motion can be used to estimate the pose of the cameras throughout the duration of a capture. The estimated camera movements from a range-of-motion sequence are used to automatically build a skeleton for the body-mounted camera configuration using co-occurring transformations of the limbs connecting each joint, and this skeleton can optionally be refined through an interactive graphical user interface. The reconstruction and skeleton are used as an accurate initialization for an overall optimization to compute the joint angles throughout the motion while minimizing the image-matching error. Reference imagery of the capture area can be leveraged to reduce the effects of drift.

By estimating the camera poses, the global and relative motion of an actor can be captured outdoors under a wide variety of lighting conditions or in extended indoor or outdoor areas without any increase or change in equipment. The system can reconstruct actions that are difficult to capture with traditional motion capture systems, including outdoor activities in direct sunlight, activities that are occluded by structures close to the actor, and extended indoor activities.

In some embodiments, a useful by-product is a sparse 3D structure of the environment (or scene) in which the motion is captured. This can be useful as a guide for defining the ground plane and as a first sketch of the scene for 3D animators and directors.

Certain aspects of the present invention relate to methods for capturing motion of a subject having a body with articulating members movable about joints. Multiple cameras are attached to the body of the subject (and/or to clothing worn by the subject), with at least some of the cameras being attached to the articulating members. At least some of the cameras are oriented toward an external environment surrounding the subject. While the subject performs an action, an image sequence is recorded from each of the cameras. Using a computer system, the image sequences recorded by each of the cameras are analyzed to determine correlations between the images. Based at least in part on the analysis of the image sequences, a sequence of articulated poses of the body of the subject is computed; in some embodiments, this computation uses the image correlations to determine camera poses (i.e., positions and orientations) for the various body-mounted cameras while imposing a skeleton structure of the body (e.g., known spatial relationships between the joint locations) as a constraint on the camera poses. The sequence of articulated poses is representative of the action. Thus, for example, one technique for computing the sequence of articulated poses includes defining a root for the body and determining a position of at least one of the joints relative to the root. In some embodiments, an absolute position and orientation for the root within the external environment may also be determined.

The sequence of articulated poses of the body of the subject can be used, e.g., to render a computer generated animation of an actor performing the action.

Motion capture can be performed in a variety of environments, including environments that contain various objects that remain stationary while the subject performs the action. The analysis of the image sequences includes generating a representation of three dimensional scene geometry based on correlating visual features across multiple ones of the images in the recorded image sequences.

In some embodiments, the scene geometry can be modeled using information from sources other than the image sequences recorded by body-mounted cameras. For example, reference images can be captured with a different camera, or predefined models of the scene geometry can be used.

Various types of cameras can be used, including visible light camera with wide fields of view (e.g., subtending an angle of at least 150 degrees). The field of view can be chosen such that the fields of view of at least some of the cameras overlap when the subject's body is in a resting position. This can facilitate correlating images from different cameras.

In some embodiments, the subject can perform a series of training motions during which different joints of the body of the subject are moved through a full range of motion. This can be used to develop a model of the skeleton of the subject for use during image analysis and computation of the articulated poses.

Certain aspects of the present invention also relate to systems for capturing motion of a subject having a body with articulating members. In some embodiments, the system includes a data input port configured to receive image sequences captured by multiple cameras worn by a subject while performing an action and a processor. The processor is configured to analyze the image sequences received from the cameras to determine correlations between the images and to compute, based at least in part on the analysis of the image sequences, a sequence of articulated poses of the body of the subject, the sequence of articulated poses being representative of the action.

In some embodiments, computing the sequence of articulated poses can include applying a structure from motion algorithm to the image sequences to determine a geometric representation of a three dimensional scene and an initial estimate of camera poses, then applying a reprojection optimization to refine the initial estimate of the camera poses. A skeleton representation of the subject can also be computed based on images from the image sequence that are associated with a range of motion exercise performed by the subject. This skeleton can be used to constrain the reprojection optimization.

In other embodiments, a system for capturing motion of a subject having a body with articulating members includes cameras, a storage medium, and a processor. The cameras are adapted to be wearable by a subject while performing an activity, such that the cameras are orientable toward an external environment surrounding the subject. The storage medium is configured to receive and store image sequences captured by the cameras, the image sequences including images captured while the subject performed the activity. The processor is configured to analyze the image sequences to determine correlations between the images and to compute, based at least in part on the analysis of the image sequences, a sequence of articulated poses of the body of the subject, the sequence of articulated poses being representative of the action.

The following detailed description together with the accompanying drawings will provide a better understanding of the nature and advantages of the present invention.

BRIEF DESCRIPTION OF THE DRAWINGS

FIG. 12A shows photos of the subject swinging from monkey bars;

FIG. 12B shows computer-generated images of a skinned character performing the same action.

FIG. 13A shows photos of the subject swinging on a swing; FIG. 13B shows computer-generated images of a skinned character performing the same action.

FIGS. 15A-15B are graphs illustrating quantitative comparisons between camera centers estimated using a conventional optical marker-based motion capture system and camera centers estimated using according to an embodiment of the present invention. In FIG. 15A, the camera centers are estimated using a structure-from-motion algorithm according to an embodiment of the present invention, and in FIG. 15B, the estimates are refined using image re-projection according to an embodiment of the present invention.

FIGS. 16A-16I are graphs illustrating quantitative comparisons between joint trajectories estimated using a conventional motion capture system and joint trajectories estimated according to an embodiment of the present invention. FIG. 16A shows the root trajectory; FIG. 16B the chest, FIG. 16C a shoulder joint; FIG. 16D the elbow joint (from the same arm) and FIG. 16E the hand. For the lower body, FIG. 16F shows the waist joint, FIG. 16G the knee joint, FIG. 16H the ankle joint, and FIG. 16I the foot.

DETAILED DESCRIPTION

Figure 1:
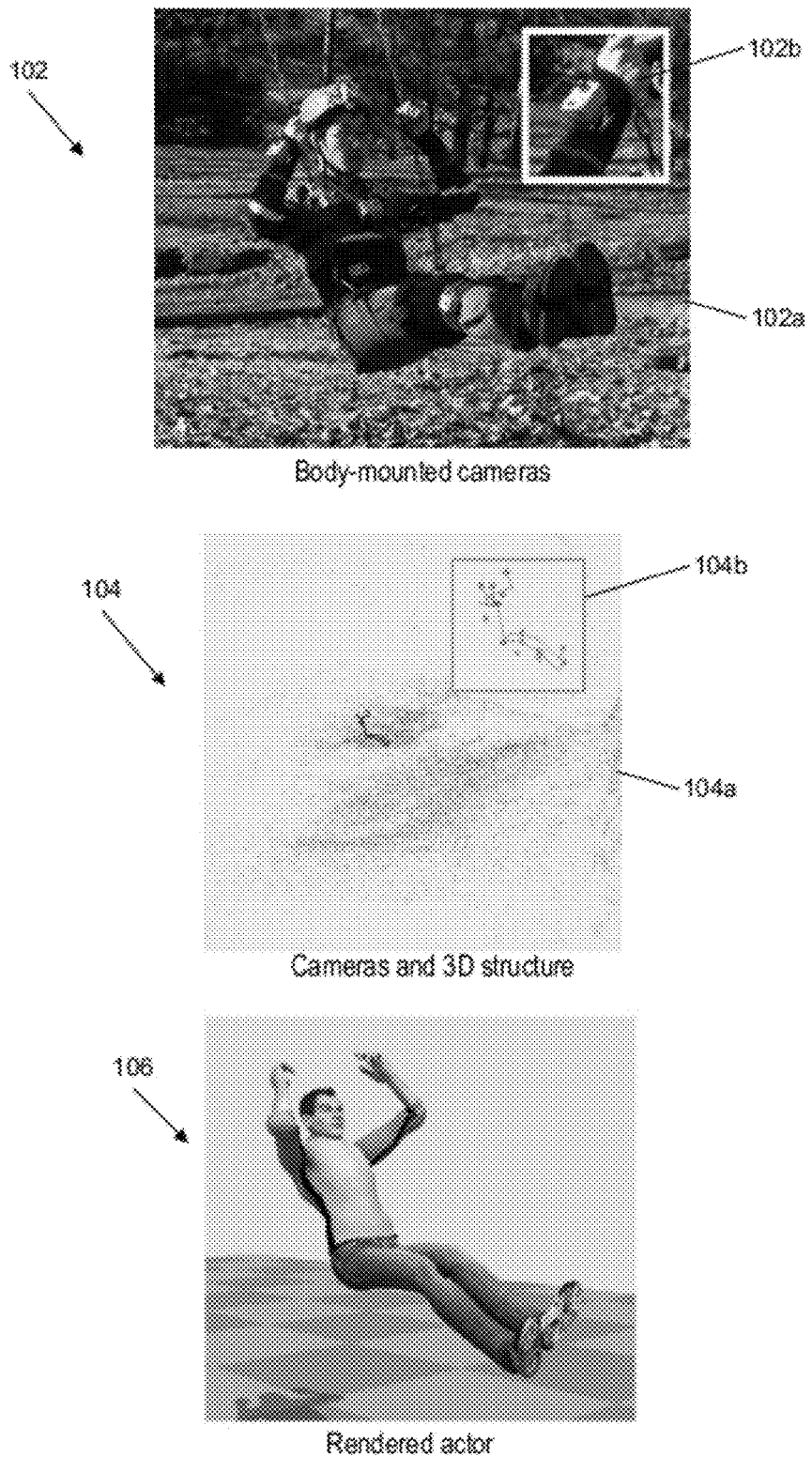
FIG. 1 illustrates operating principles of a motion capture process according to an embodiment of the present invention.

Embodiments of the present invention provide motion capture techniques using body-mounted cameras worn by the subject whose motion is being captured. Outward-looking cameras are attached to the body of the subject, and the joint angles and root pose that define the subject's configuration are estimated through a non-linear optimization, which can incorporate image matching error and temporal continuity of motion. The system can be used in situations where image capture would be difficult or impossible with traditional motion capture systems, including extended walking outside and swinging on monkey bars.

In some embodiments, the use of outward-looking cameras allows reconstruction of the relative and the global motion of a subject (e.g., an actor) outside of a laboratory or closed stage. The cameras can be worn on casual clothing, can be easily mounted and removed (e.g., using Velcro attachments), and can be compact and lightweight enough to allow unimpeded movement. Structure from motion can be used to estimate the pose of the cameras throughout the duration of a capture. The estimated camera movements from a range-of-motion sequence are used to automatically build a skeleton for the body-mounted camera configuration using co-occurring transformations of the limbs connecting each joint, and in some embodiments this skeleton can optionally be refined through an interactive graphical user interface (GUI). The reconstruction and skeleton are used as an accurate initialization for an overall optimization to compute the joint angles throughout the motion while minimizing the image-matching error. Reference imagery of the capture area can be leveraged to reduce the effects of drift.

By estimating the camera poses, the global and relative motion of an actor can be captured outdoors under a wide variety of lighting conditions or in extended indoor or outdoor areas without any increase or change in equipment. The system can reconstruct actions that are difficult to capture with traditional motion capture systems, including outdoor activities in direct sunlight, activities that are occluded by structures close to the actor, and extended indoor activities.

In some embodiments, a useful by-product is a sparse 3D structure of the environment (or scene) in which the motion is captured. This can be useful as a guide for defining the ground plane and as a first sketch of the scene for 3D animators and directors.

The motion capture systems described herein are camera-based and therefore have access to rich data, including a detailed view of the environment, not available to inertial motion sensors or the like. However, the data are more difficult to process because the limb motion cannot be directly computed from the camera data. Instead, the images from the cameras are used along with estimated 3D geometry of the scene to recover the 3D limb positions in the world over time. As described below, techniques related to existing Structure from Motion (SfM) and visual analysis can be leveraged and extended to analyze image sequences from multiple correlated cameras, allowing recovery of the articulated motion of a body.

By way of high-level overview, FIG. 1 illustrates operating principles of a motion capture process according to an embodiment of the present invention. Image 102 illustrates a subject performing an activity (in this case swinging on a swing, as seen in main image 102a) while wearing a number of body-mounted cameras, as shown in close-up in inset 104a. Image 104 illustrates that information about the scene geometry (main image 104a) and the pose of the subject (inset 104b) can be extracted from the images collected by the cameras. Image 106 illustrates a rendered actor performing the motion; the actor in this example is rendered based on the skeleton generated by motion-capture analysis. It should be noted that no special instrumentation of the environment is required. The cameras capture images of the subject's environment, and from those images the environment as well as the movements of individual parts of the subject's body can be reconstructed.

Specific examples of motion capture systems and processes according to embodiments of the invention will now be described.

Figure 2:
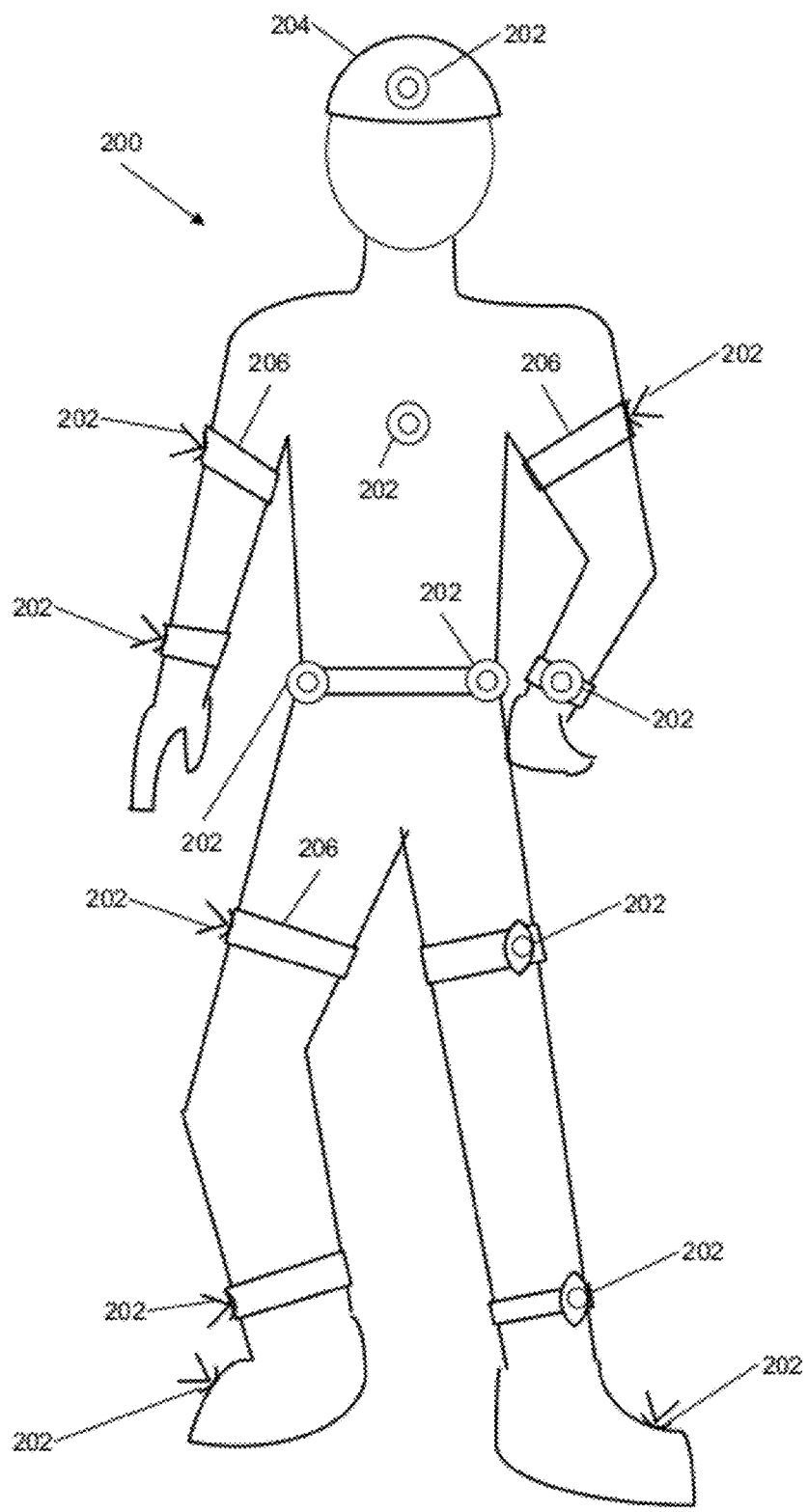
FIG. 2 illustrates a motion-capture setup according to an embodiment of the present invention.

FIG. 2 illustrates a motion-capture setup according to an embodiment of the present invention. A subject 200 (in this example, a human) wears a plurality of cameras 202. The cameras can be affixed to the subject's clothing (e.g., mounted on a helmet 204 worn by the subject) or strapped on, e.g., with Velcro straps 206. Cameras 202 are advantageously oriented so that they tend to point away from the subject's body and toward the surrounding environment when the subject is in a relatively neutral position (e.g., standing with arms relaxed at his sides).

Cameras 202 can be digital cameras (e.g., using CMOS sensors) of generally conventional design. One embodiment uses consumer grade wide-angle (170 degree field of view) "HD Hero" sport action cameras from GoPro (www.gopro-camera.com). Other cameras can also be used. Cameras 202 advantageously have light weight and small form factor for optimum wearability. (By way of example, the HD Hero cameras weigh 94 grams each and have a form factor 42 mm×60 mm×30 mm.) The resolution and frame rate are matters of design choice; one embodiment uses 720p (1280×720) resolution at a frame rate of 60 frames per second (fps). Each camera 202 can include a local storage medium (e.g., flash memory or a small form-factor portable hard disk drive) to record captured image frames. In some embodiments, cameras 202 may be able to transmit images in real time to a remote location for storage (e.g., via a high-speed wireless network).

Prior to motion capture, cameras 202 can be calibrated using standard camera calibration techniques to provide estimates of their focal lengths, principal points, and radial distortion coefficients. Assuming that the lens and focal length remain fixed, these estimates need to be computed only once and are re-usable across captures.

Any number of cameras 202 can be used. In general, more cameras allow for more detailed information and therefore a more accurate motion capture result, but more cameras also increase the weight of the system and (depending on placement) may interfere with the subject's motion. In one embodiment, a human subject wears 19 cameras placed at various locations on his body. The cameras are advantageously distributed across all parts of the subject's body that are to be modeled but need not be at any particular locations; as described below, an underlying skeleton structure for the subject can be determined in the data analysis stage without prior information as to the subject's body dimensions or exactly where on the body particular cameras are located. For example, it may be known that cameras are located on the user's thigh and shin without knowing exactly where along the thigh or shin.

The invention is also not restricted to any particular type of camera, and a combination of different types of cameras can be used. As described below, a motion capture process advantageously exploits correlations among images acquired by different cameras (and among different images acquired by the same camera). Cameras with a relatively wide field of view (e.g., viewing angles greater than about 150 degrees) provide greater opportunity for detecting correlations. The frame rate can be chosen as desired; higher frame rates will generally provide a finer granularity of motion information and greater likelihood of being able to correlate consecutive images. Different cameras used in the same system can have different frame rates; as long as the frame rate of each camera is known, frames from different cameras corresponding to the same time can be identified. Similarly, the resolution of the cameras can be chosen as desired, with higher resolution tending to provide better feature detection (which facilitates correlating the images); different cameras can have different resolutions.

Further, while the cameras used in embodiments described herein are sensitive to visible light, cameras sensitive to other frequencies (e.g., infrared) can also be used.

In operation, cameras 202 record images while subject 200 performs an activity. Subject 200 can perform the activity in any location desired, including indoor and outdoor environments. To facilitate reconstruction of the subject's motion, the environment advantageously includes a number of stationary objects at not too great a distance from the subject that are discernible against whatever background may be visible. For example, in an office environment, doors, wall decorations, desks and other furniture may serve as stationary objects. In an outdoor environment, stationary objects may include lamp posts, recycling collection bins, benches, trees, bushes, sculptures, buildings, parked cars, playground or athletic fixtures or props (e.g., jungle gym, basketball hoop, soccer goal, pylons), or the like.

Any activity can be performed, including but not limited to walking, running, dancing, fighting, swinging on a swing, climbing on monkey bars or other playground equipment, riding a bicycle or horse, driving a car, performing acrobatic or gymnastic maneuvers, and so on. It should be noted that the optimal number and/or positioning of cameras may depend on the activity to be performed; for example, it may be desirable to avoid placing cameras where they are likely to crushed or otherwise damaged during the activity or where they would be substantially occluded.

It is also to be understood that the subject need not be a human being. Cameras can be attached to non-human subjects, such as animals, robots or other mechanical devices, or the like.

It is contemplated that the subject will have a body with one or more articulating members (i.e., members whose position and/or orientation can change relative to other parts of the body, such as limbs or a head in the case of a human body) with a defined skeletal pattern. The cameras are advantageously attached to the articulating members and/or other parts of the body such that it is possible to reconstruct articulations of the skeletal structure, e.g., using techniques described below.

Figure 3:
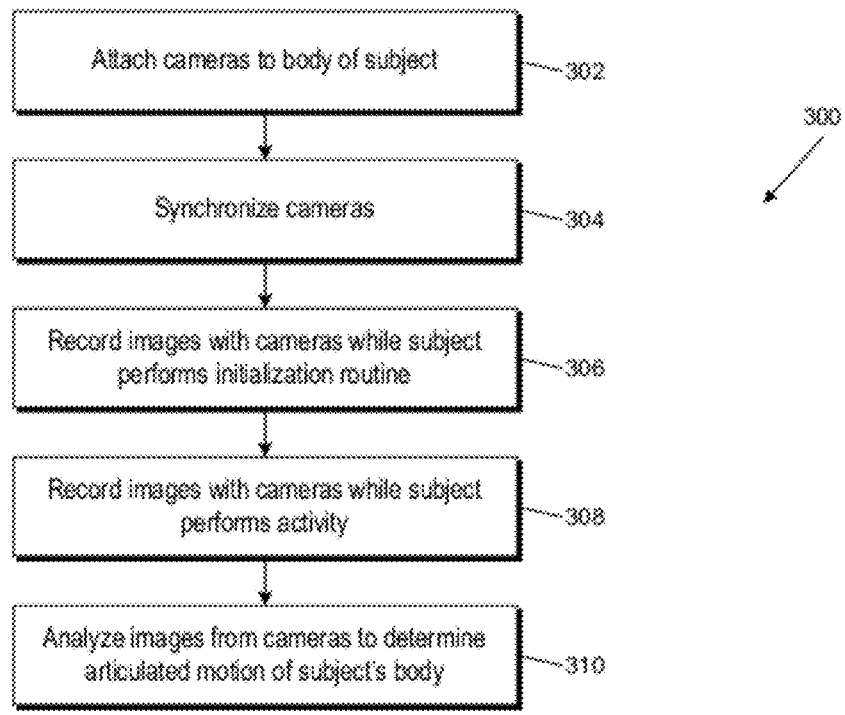
FIG. 3 illustrates a motion-capture process that can be performed using the system of FIG. 2.

FIG. 3 illustrates a motion-capture process 300 that can be performed using the system of FIG. 2. At block 302, cameras are attached to a subject's body. As noted above, the cameras can be incorporated into the subject's attire or strapped to the subject. (In the case of a mechanical subject, such as a robot, cameras could also be built into the subject.) It is assumed here that the cameras were previously calibrated to determine optical characteristics such as focal lengths, principal points, and radial distortion coefficients.

Motion capture begins at block 304, where the cameras are synchronized. Synchronization can be accomplished using any technique that creates a common time marker in the video sequences obtained from each of the cameras. For example, in embodiments where the cameras are capable of recording audio as well as video, synchronization can be accomplished by producing a distinctive sound that is recorded by all cameras. For example, an assistant on the scene can clap a clapper board or shout "action," or a bell can be sounded or other distinctive tone produced. In other embodiments where the cameras have internal clocks that are used to provide absolute timestamps for images, synchronization can be achieved by setting or correlating the internal clocks across the various cameras to define a common time base.

At block 306, the subject can perform an initialization routine while the body-mounted cameras are recording. The initialization routine can include a range-of-motion exercise in which the subject moves various joints across the full range of motion in the applicable degrees of freedom. This exercise facilitates accurate determination of the subject's skeletal structure (as described below) regardless of exactly where the cameras are attached. The initialization routine may also include collecting "reference images" that can be used to help reconstruct the environment in which the motion is being recorded. For example, the subject may turn around slowly (e.g., through a full 360 degrees) or stand still for some period of time (e.g., a few seconds) as the cameras record the images, then move to another location and turn again. In some embodiments, the reference images may be collected using cameras other than the body-mounted cameras worn by the subject. For example, the subject may stop and take a photo from time to time during the capture session or simply come to rest while the body-mounted cameras continue to record images.

At block 308, as the cameras continue to record, the subject performs one or more activities (or actions) that are to be captured. The nature and duration of the activity are not limited in principle (although in practice duration may be limited by the recording capacity and or finite power supply of the cameras). In some embodiments, the subject may pause at times during the activity to capture additional reference images.

At block 310, the video data (also referred to herein as image sequences) is retrieved from the cameras and analyzed to determine the motion of the subject's body. In some embodiments, the data from all cameras is transferred to a single computer system, which performs the analysis. As described below, the analysis can include producing a representation of the subject's skeleton and the configuration of the skeleton over time. In addition, the analysis can include constructing a representation of the 3-D environment in which the motion was captured, to provide reference points for the motion analysis.

Figure 4:
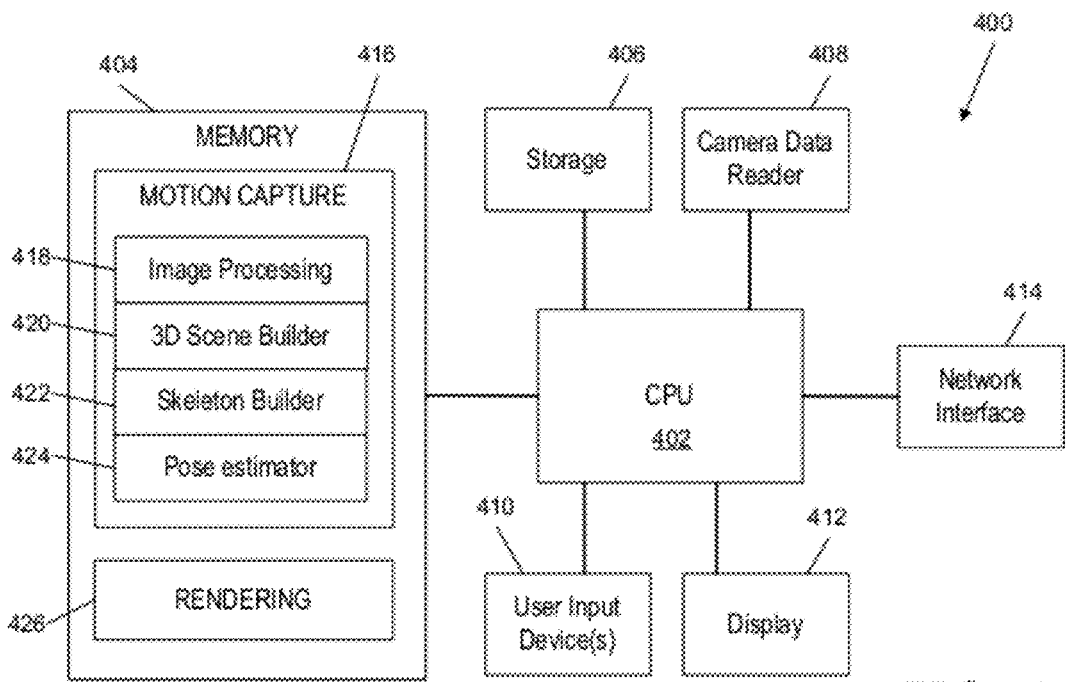
FIG. 4 is a simplified block diagram of a computer system usable for motion analysis according to an embodiment of the present invention.

FIG. 4 is a simplified block diagram of a computer system 400 usable for motion capture analysis according to an embodiment of the present invention. Computer system 400 includes a central processing unit (CPU) 402, memory 404, a nonvolatile storage medium 406, a camera data reader 408, a user input device 410, a display 412, and a network interface 414.

CPU 402 can be implemented using one or more conventional programmable microprocessors. In operation, CPU 402 controls and manages operations of computer system 400 by executing various program code including operating system and application programs. In some embodiments, additional processing resources such as graphics accelerators, co-processors, or the like can be provided to augment the processing capability of CPU 402.

Memory 404 can be implemented using conventional memory technologies (e.g., DRAM, SDRAM, SRAM, etc.) and may include volatile and/or non-volatile sections. In operation, memory 404 can temporarily store program code being executed by CPU 402 as well as data that may be produced and/or consumed by the executing program code. For example, memory 404 can store a motion capture program 416 incorporating various embodiments of the present invention, as described below. While motion capture program 416 is shown as being resident in memory 404, it is to be understood that at various times program 416 and other program code can be stored in other media and/or internally within CPU 402.

Nonvolatile storage medium 406 can be implemented using conventional storage technologies (e.g., magnetic disk, flash memory, optical media, etc.) and can be used to store program code and/or data for use by CPU 402. In some embodiments nonvolatile storage medium 406 can be used to store image sequences collected from cameras 202 (FIG. 2).

Camera data reader 408 can incorporate any device or input port usable to transfer data from cameras 202 to computer system 400. For example, in some embodiments, camera data reader 408 can be a memory-card reader and cameras 202 can include removable memory cards. Images captured by each camera 202 are written to its memory card, which is later removed from camera 202 and inserted into data reader 408. Alternatively (or in addition), camera data reader 408 can include one or more Universal Serial Bus (USB) ports or the like; a camera 202 can be connected to this port by a suitable cable, allowing image data to be transferred. Other data ports, including wired and/or wireless interfaces, can also be used. In some embodiments, images may remain stored within cameras 202 throughout the analysis process, and computer system 400 can communicate with cameras 202 to obtain image data as needed during analysis.

One or more user input devices 410 and a display 412 can be provided, allowing a user to interact with computer system 400, e.g., to control transfer of images from cameras 202 and/or various operations of motion capture program 416, as well as to view various results of the motion capture. Examples of user input devices include keyboards, mice, joysticks, pen tablets, touch pads, touch screens, microphones, and the like. Display 412 can use conventional display technologies (e.g., LCD screens).

Network interface 414 can be provided to allow computer system 400 to communicate with other computers, e.g., via a local area network, wide area network, the Internet, or other networks. Network interface 414 can include suitable components for wired and/or wireless communication. In some embodiments, cameras 202 can provide image data via network interface 414, and a separate camera data reader 408 is not needed. In some embodiments, a user can access computer 400 and control operations of motion capture software 416 from a remote computer via network interface 414 (e.g., using a client/server model); accordingly, it is not required that computer system 400 provide user input or user output devices.

Motion capture program code 416 can include various modules associated with different aspects of motion capture analysis. For example, an image processing module 418 can be provided to perform initial processing on images received from cameras 202. Such processing can include noise reduction, color correction, correction for lens distortion, feature detection, and the like; standard processing techniques can be used in this module.

A 3D scene builder 420 can operate on the images after initial processing. In some embodiments, 3D scene builder 420 extracts information from the images about the 3D geometry of the external environment in which the motion capture occurred. As described below, such information can be extracted by correlating features across images captured by different cameras at the same time, images captured by the same camera at different times, and/or images captured by different cameras at different times. In some embodiments, 3D scene builder 420 can be provided with information about scene geometry from sources other than the cameras (e.g., a model of the environment that was created independently of the motion-capture process) and can determine correlations between features found in the camera images and the provided scene geometry. Examples of specific techniques for scene building are described below.

A skeleton builder 422 can also operate on the images after initial processing, with or without 3D scene geometry information from scene builder 420. Skeleton builder 422 uses information from the images to determine parameters of the subject's body, such as the distances between joints and the position and orientation (pose) of the various cameras relative to the joints. In some embodiments, skeleton builder 422 operates on images that were collected while the subject was performing a range-of-motion exercise (e.g., at step 306 of process 300). In some embodiments, skeleton builder 422 can also receive body parameters (e.g., distances between joints, camera position and orientation) from another source; for instance, a user may be able to input the parameters interactively, or the user may be able to provide skeleton builder 422 with a structured data file containing the parameters. Examples of specific techniques for skeleton building are described below.

A pose estimator 424 uses the information from 3D scene builder 420 and skeleton builder 422 to generate estimates of a sequence of poses assumed by the subject while doing the activity that is to be captured. Using the skeleton as a model, pose estimator 424 can define each pose by reference to a root position, and orientation, which can be expressed in world coordinates, and a set of joint angles and/or joint positions. (For example, the root position for a human subject may be defined by the position of the pelvis, with joints corresponding to hips, knees, ankles, chest, shoulders, elbows, wrists, etc.; other body parts can also be selected for defining the root position.) The poses are estimated based on the images from the various cameras and an estimate of where the cameras would have been in relation to scene geometry (as provided by scene builder 420) in order to generate those images. From this estimate and a model of camera position and orientation relative to the skeleton (as provided by skeleton builder 422), the pose can be determined. Examples of specific techniques for pose estimation are described below.

In some embodiments, motion capture is considered complete when the sequence of poses associated with the activity being captured has been determined. The motion-capture result can also be used in further processing. For example, in some embodiments, system 400 can execute rendering program code 426, which can render a virtual actor performing the captured motion, e.g., by applying "skin" to the skeleton in the sequence of poses; conventional techniques for rendering a virtual actor from a given skeleton pose can be used. In some embodiments, rendering program code 426 can also render a scene surrounding the virtual actor; again conventional techniques may be used. Some or all of the 3D scene geometry estimated by scene builder 420 can be used as a starting point for rendering the scene if desired, or the user of the rendering software can start from scratch and create any scene desired, including lighting, camera angles, colors, etc. In some embodiments, rendering program code 426 may be provided on a different computer system from that used for motion capture analysis, and the pose sequence can be communicated from the motion-capture system to the rendering system, e.g., via a network or via removable storage media that can be physically transferred from one system to the other. It is also possible to build up a library of captured pose sequences that can be accessed by users on other systems.

It will be appreciated that computer system 400 is illustrative and that variations and modifications are possible. A variety of systems and architectures can be used to implement techniques consistent with the scope and spirit of the present invention. For example, in some embodiments, computer processing power to perform motion-capture analysis may be provided using multiple cooperating computer systems that implement parallel processing and/or distributed computing techniques.

Figure 5:
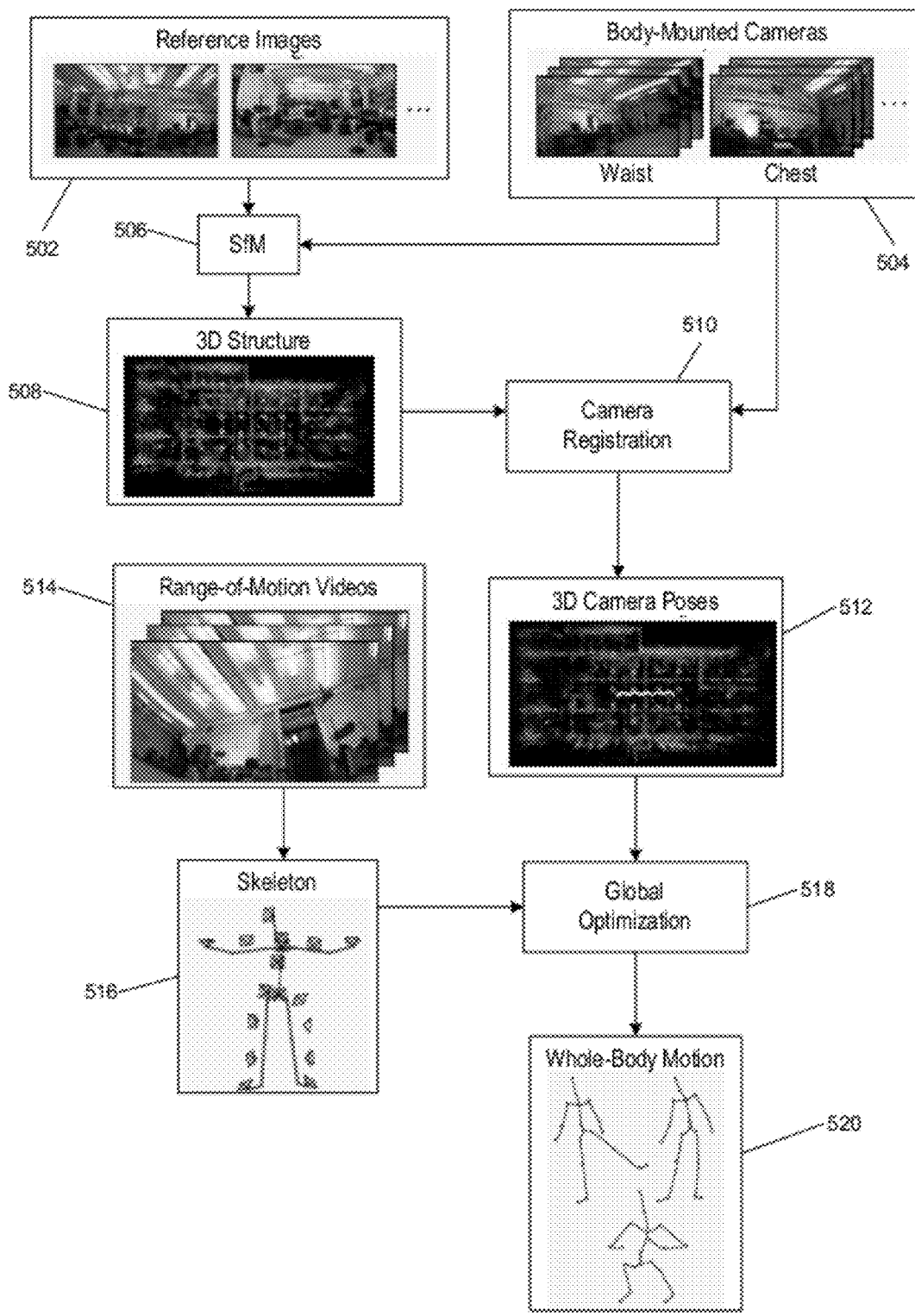
FIG. 5 illustrates operating principles for motion analysis according to an embodiment of the present invention.

FIG. 5 illustrates operating principles for motion analysis according to an embodiment of the present invention. Starting from reference images 502 and video data 504 from body-mounted cameras, structure-from-motion (SfM) algorithms 506 can be applied to generate a sparse 3D scene representation 508. Scene representation 508 is used with video data 504 in camera registration process 510 to generate a sequence of 3D camera poses 512 (i.e., where, in 3D space, each camera is positioned and oriented at a given time). The video data can include range-of-motion videos 514 that are usable to generate a skeleton representation of the subject 516. A global optimization 518 can be applied to 3D camera poses 512, using skeleton 516 to constrain the camera poses, resulting in a whole-body motion estimate 520. In some embodiments, global optimization 518 entails optimizing re-projection error of the 3D structure with respect to motion of the skeleton, with the structure-from-motion results being used as an initial estimate. As indicated in particular by skeleton 516 and motion estimate 520, motion estimation includes estimating the articulated motion of the skeleton, i.e., changes in relative positions between different body members; it can also include estimating the general motion of the subject through the environment. For example, the motion of a "root" (a particular point on the skeleton, such as the head, center of chest, or pelvis) can be estimated, and motions of the various limbs and joints can be estimated relative to the root.

Figure 6:
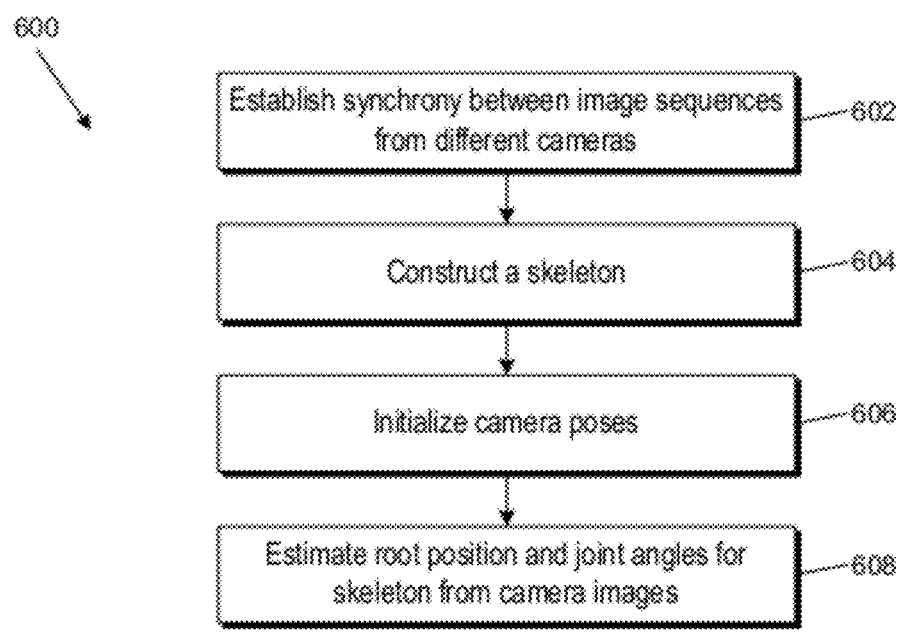
FIG. 6 is a flow diagram of a process that can be used for motion capture analysis according to an embodiment of the present invention.

FIG. 6 is a flow diagram of a process 600 that can be used for motion capture analysis according to an embodiment of the present invention. Process 600 can be executed, e.g., in computer system 400.

At block 602, video from different cameras is synchronized. For example, where an audible sound is used for synchronization in process 300 as described above, block 602 can include analyzing the audio component of the data to detect that sound in each camera's video data. Different cameras may or may not have started recording simultaneously, so the synchronization sound (or other event) may occur at different points in the sequence for different cameras.

Figure 7:
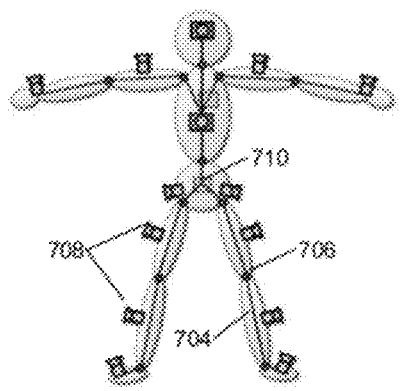
FIG. 7 shows an example of a skeleton that can be reconstructed according to an embodiment of the present invention.

At block 604, a skeleton representation (also referred to simply as a "skeleton") of the subject is constructed, e.g., using the range-of-motion video data collected at block 306 of process 300 above. A skeleton can be estimated from body-mounted camera poses. FIG. 7 shows an example of a skeleton 700. The members of the subject's body are represented as lines (e.g., 704 is a shin) and the joints by circles (e.g., 706 is a knee). A number of camera locations 708 are indicated. In some embodiments, the skeleton is parameterized in terms of a root position (e.g., pelvis 710) and relative joint angles. A specific technique for construction of a skeleton from image data is described below. In some embodiments, e.g., where the same subject has performed a number of different motions, constructing a skeleton may not be necessary, as the subject's skeleton may already have been established.

At block 606, camera poses are initialized, e.g., using a structure-from-motion (SfM) algorithm as described below, to establish a "sparse" representation of the 3D environment surrounding the subject and registering camera poses (position and orientation) within the 3D environment. The SfM analysis has been found to reduce drift in the recovered motions but can be omitted if desired.

At block 608, based on the skeleton, the 3D environment, and the image data, a sequence of articulated skeleton poses associated with the captured activity can be computed. In some embodiments, the raw measurements are image correspondences obtained by matching Scale-Invariant Feature Transform (SIFT) features across images [Lowe, D., "Distinctive Image Features from Scale-Invariant Keypoints," *International Journal of Computer Vision* 60, 2, 91-110 (2004); Lowe, U.S. Pat. No. 6,711,293, issued Mar. 23, 2004]. Defining O as the time sequence of root positions in the world coordinate system, i.e., O={O(t)} for all times t (t can be conveniently represented using frame numbers associated with camera images), and A as the time sequence of joint angles in the local coordinate system, i.e., A={A(t)} for all times t, the sequences O and A can be estimated by minimizing the distance between the measured 2D image points and the corresponding projected 3D structure, according to the following equations:

$$\{O^*, A^*\} = \underset{O,A}{\operatorname{argmin}}(E_\tau + \lambda_O E_O + \lambda_A E_A); \quad \text{(Eq. 1a)}$$

$$E_\tau = \sum_{j,t,p} \|P_j(X_p, t, O, A)\|_\Sigma^2 + \sum_{j,t,h} \|H_j(t, A, \hat{x}_{j,t,h}) - \hat{x}_{j,t,h}\|_\Sigma^2; \quad \text{(Eq. 1b)}$$

$$E_O = \sum_t \|O(t) - O(t-1)\|_\Sigma^2; \text{ and} \quad \text{(Eq. 1c)}$$

$$E_A = \sum_t \|A(t) - A(t-1)\|_\Sigma^2. \quad \text{(Eq. 1d)}$$

Eq. (1a) seeks to minimize a function of a reprojection term $E_\tau$ and two smoothness terms $E_O$ and $E_A$; these terms are defined by Eqs. (1b), (1c), and (1d) and are described further below. Regularization coefficients, $\lambda_O$ and $\lambda_A$, account for the smooth transitions between frames, minimizing the displacement of the root and joint angles across time. In Eq. (1b), $P_j(\ )$ is a camera projection function for the j-th camera, $H_j(\ )$ is a function to apply a homography between consecutive images to an image measurement for the j-th camera, $X_p$, is the 3D location of the p-th point in world coordinates, x is the corresponding 2D measurement of the p-th point for the j-th camera, and $\hat{x}$ is a 2D measurement after lens distortion correction. The first sum is taken over cameras j, times t and 3D points p, while the second sum is taken over cameras j, times t and 2D homographies h.

Eq. (1a) is highly non-linear, resulting in a difficult optimization problem. In some embodiments, the optimization can be facilitated by establishing a good initial estimate of the camera poses and skeleton. For example, as indicated in FIG. 5, skeleton 516 can be estimated from a range-of-motion exercise in which the subject articulates joints to their full extent to produce range-of-motion videos 514; an example of a skeleton estimation technique is described below. Even with a skeleton, solving Eq. (1a) requires highly nonlinear minimization. This can be somewhat simplified by initializing the optimization parameters (the root position and joint angles) based on the body-mounted camera poses estimated by the structure-from-motion algorithm; an example of this initialization is described below.

It will be appreciated that process 600 is illustrative and that variations and modifications are possible. Steps described as sequential may be executed in parallel, order of steps may be varied, and steps may be modified, combined, added or omitted. For instance, in some embodiments, the user has an option to refine the automatically-generated skeleton by changing the pose of the camera with respect to the joint, e.g., using a graphical interface. This can be useful in cases where the range-of-motion trial used to construct the skeleton turns out to be insufficient to span all degrees of freedom for the body and may involve adjusting a small number (e.g., 1 or 2) of joints. The reconstructed motion can be further refined using an image-based nonlinear optimization that incorporates temporal smoothing and regularization.

Specific implementations of various aspects of motion estimation will now be described, including camera pose estimation, skeleton reconstruction, and global optimization.

Turning first to camera pose estimation, as noted above, a structure-from-motion algorithm can be used; in some embodiments, the estimate from the SfM algorithm can provide an initialization for Eq. (1a).

Direct incremental structure-from-motion from body-mounted cameras yields precise 3D reconstruction locally but can suffer from global drift when the capture area is large and 3D structure is far from the camera locations. Simultaneous estimation of camera positions and 3D structure can produce un-rectified 3D reconstruction results due to misestimated intrinsic parameters, lens distortions, or rolling shutter effects. To avoid undesirable 3D reconstructions and drift, some embodiments of the present invention employ reference images (e.g., images 502 in FIG. 5) of the environment in which the activity is performed in addition to the body-mounted camera images; the 3D structure can be reconstructed using these reference images. Using the 3D structure reconstructed from the reference images together with 2D measurements extracted from the body-mounted camera videos, body-mounted camera poses are recovered; this process is referred to herein as "absolute camera registration." Because the field of view of cameras on the body during motion may be quite different from that of the reference images, some cameras cannot be absolutely registered. The density of camera reconstruction can be increased by adding 3D structure obtained from absolute-registered cameras and rerunning the registration to register additional cameras; this process is referred to herein as "relative camera registration." Examples of both processes are described below.

Reference images can in principle be captured by any camera, either as a set of independent static photographs or as frames from a video. Body-mounted cameras observe the scene from a predefined trajectory mapped out by the motion of the body. In contrast, reference images can be collected from a variety of viewpoints, which can be selected to ensure a wide baseline between images and accurate 3D reconstruction of the scene. In some embodiments, all reference images can be collected by one detached camera that can be operated by the subject or an assistant.

From the reference images, SIFT keypoints for each pair of images collected can be matched by considering the Euclidean distance of their descriptors. For example, an approximate nearest neighbor snatching procedure as described in [Muja, M. and Lowe, D. G., In *International Conference on Computer Vision Theory and Application VISSAPP* '09, INSTICC Press, 331-340 (2009)] can be used.

To estimate the extrinsic parameters of the cameras, it is useful to choose an initial pair of images that has a significant number of matches that cannot be accounted for by a homography. This selection ensures a wide baseline between the images because a homography can exactly describe any camera motion where the camera center remains fixed. From the matches, relative camera orientation and translation can be estimated and the location of the matched feature points in 3D space can be determined, e.g., using the Direct Linear Transform algorithm as described in [Hartley and Zisserman, *Multiple View Geometry in Computer Vision*, Cambridge University Press (2004)] followed by a two-image bundle adjustment, e.g., as described in [Lourakis and Argyros, "SBA: A Software Package for Generating Sparse Bundle Adjustment," *ACM Transactions on Mathematical Software*, 36, 1, 1-30 (2009)]. The image that has the greatest number of inlier 3D-2D correspondences is added, and the process can be repeated to add additional images. As each image is added, the corresponding camera pose can be reconstructed using a Perspective n-Point (PnP) algorithm, e.g., as described in [Leptit et al., "EPnP: An Accurate O(n) Solution to the PnP Problem," *International Journal of Computer*Vision 81, 2, 155-166 (2009)] inside a RANSAC procedure [Fischler, M. and Bolles, R., *Communications of the ACM*, 24, 6, 381-395 (1981)].

Figure 8A:
FIGS. 8A-8C show a 3D reconstruction of reference images according to an embodiment of the present invention, with FIG. 8A illustrating the 3D structure, FIG. 8B illustrating the camera registrations after a first iteration of registration processing, and FIG. 8C illustrating the camera registrations after a fifth iteration.

Once the extrinsic parameters for the new camera are reconstructed, 2D-2D correspondences between reconstructed images and the newly added image are reconstructed in 3D. In some embodiments, a point/feature is added if it has been observed by at least one other camera, if it is well-conditioned, and if its triangulated position has low re-projection errors in all of the cameras that observe it. For example, 3D points can be excluded based on any the following criteria: high reprojection error (e.g., more than 1 pixel) or small angle subtended by the rays used for triangulation (e.g., less than 2°). The points that meet the criteria are added to the recovered 3D structure; points that do not meet the criteria can be kept for possible later matches with features observed in as yet unprocessed images. Once the structure has been updated, a sparse bundle adjustment is run to refine the entire model. This process continues until the entire set of images from all of the cameras is registered. Finally, a sparse bundle adjustment process can be run on all of the frames to minimize the error between the image measurements and the projected reconstructed structure. FIG. 8A shows a 3D reconstruction of reference images for one example.

After the 3D structure is reconstructed from the reference images, it can be used to estimate the body-mounted camera poses. Similar to adding a new reference image as described above, matches can be found between the SIFT feature set clustered by approximate nearest neighbor and the SIFT features from images captured by body-mounted cameras. For example, RANSAC with PnP can be used to find the best extrinsic camera parameters, e.g., parameters that produce less than 1 pixel re-projection error when the number of 3D-2D correspondences are sufficient (e.g., more than 50). Once the camera parameters are estimated, the 3D points are triangulated using 2D-2D correspondences between the newly registered image and the previously registered images. The same criteria for adding a new point with the reference image registration can be applied, and in some cases camera pairs can be ignored if their optical axes differ in orientation by more than 90°. The bundle adjustment refines newly registered camera poses and the 3D structure; the 3D structure obtained from the reference images remains fixed and can serve as an anchor to avoid or reduce drift. The absolute registration process can be iterated for all images. In some embodiments, after absolute registration, 10 to 50% of the images can be registered.

In some embodiments, reconstruction from the absolute camera registration is sparse, e.g., because the viewing angles of the reference images are different from those of images from the body-mounted cameras. To increase the density of reconstruction for the body-mounted camera poses, matches can be found between the images from the absolute-registered camera and the images from the unregistered cameras. Because the camera passes absolute registered poses, the view points of the unregistered images are similar to that of the absolute registered images. This process enables reconstruction of the rest of the camera poses. After the relative camera registration, 60 to 95% of the images can be reconstructed.

Figure 8B:
Figure 8C:

Absolute and relative camera registration can be iterated until the number of camera registrations is satisfactory. FIGS. 8B and 8C show the increase in the number of camera registrations for one example case. While the first iteration (FIG. 8B) produces a sparse set of camera registrations, the fifth iteration (FIG. 8C) fills most of gaps from the first iteration.

It should be noted that camera registration based on structure from motion is highly dependent on scene textures and field of view. Also finding 3D-2D correspondences between the reference structure and registration images is a computationally expensive procedure. In some cases, a particular system may not find sufficient number of inliers to register cameras using RANSAC-based camera pose estimation. For example, cameras mounted on a person's feet tend to have limited field of view, and their captured scenes are significantly different from other cameras; as another example, if a camera is moving fast (e.g., a camera on a running subject's shin), the images may be blurry. For these reasons, the registrations of some cameras can be very challenging, and even after many iterations, there may be cameras for which only a few images are registered.

To deal with such missing data, camera orientation can be estimated using homography between consecutive frames. When the camera center of two images coincides, the relative orientation can be obtained by estimating homography between consecutive 2D image correspondences. For high frame rates (e.g., 60 fps), it can be assumed that the translation between two frames is small enough to neglect compared to the distance from 3D points and camera center. With this assumption, 2D-2D correspondences can be extracted based on the SIFT keypoint descriptors, and homography can be found robustly using RANSAC. Once the homography H is estimated for cameras $C_1$ and $C_2$, the relative orientation $^{C_2}R_1$ can be obtained by:

$$^{C_2}R_1 = K_{c_2}^{-1} H K_{c_1}, \quad (\text{Eq. 2})$$

where K is a 3×3 intrinsic parameter matrix, and $Hv_1=v_2$, where $v_1$ and $v_2$ are 2D-2D correspondences between consecutive images. When there are missing data, the relative orientation allows them to be interpolated. If camera positions are also needed, linear interpolation of the positions between registered cameras is used. To avoid drift resulting from one-way estimation, an average of forward and backward interpolation can be applied. This interpolation provides the initialization of joint angles and root positions for Eq. (1a), with the inlier 2D-2D correspondences used for the homography computation being used as image measurements in the subsequent optimization.

Examples of techniques that can be used to estimate a skeleton for a subject (e.g., at block 604 of FIG. 6) will now be described. It is assumed that each articulating member in the skeleton can be modeled as a rigid object attached to another member (also a rigid object) at a well-defined joint. The joint provides a range of motion of the articulating member in one or more degrees of freedom. The number of members, number of joints, range of motion and degrees of freedom at each joint will depend on the particular body being modeled. While human bodies are used herein for purposes of illustration, it is to be understood that the invention is not limited to human bodies or indeed to creatures with bones; a skeleton representation can be constructed for any natural or artificial body having articulating members. Further, in some embodiments, biomechanical constraints are not applied; instead it is assumed that any joint can articulate to any angle along any degree of freedom independently of what other joints are doing. In other embodiments, biomechanical constraints can be introduced if desired.

As noted above, in some embodiments, the subject performs a predefined range-of-motion exercise to facilitate automatic determination of the underlying skeleton structure. This can be done, e.g., prior to or immediately after motion capture. Preferably the range-of-motion exercise and the motion capture are performed without removing or repositioning any of the body-mounted cameras, to minimize error that may be caused by not replacing a camera in exactly the same position. An accurate skeleton can be generated by collecting images spanning the full degrees of freedom of each joint.

Figure 9:
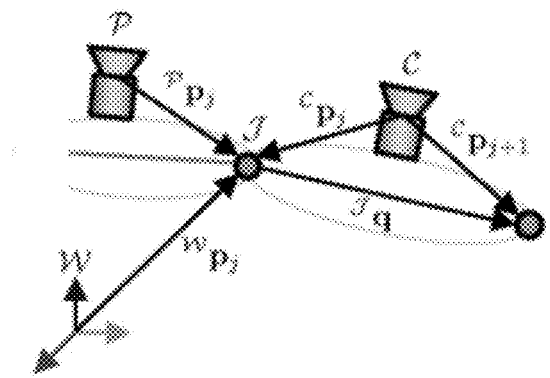
FIG. 9 illustrates coordinate systems and transforms associated with parameterization of a skeleton according to an embodiment of the present invention.

In some embodiments, the skeleton is modeled as a "root" and one or more series of joints connected in a kinematic chain, where each joint in a kinematic chain is represented as a point that connects a parent limb (closer to the root) and a child limb (farther from the root). The limbs can be associated with a parent camera P and a child camera C. While the joint positions in the world coordinate system $^W p_j$ can change over time, the joint positions in the parent and child camera coordinate systems $^P p_j$ and $^C p_j$ are constant. FIG. 9 illustrates the parameterization, and the coordinate transform:

$$^W p_j = {^W T_P(t)} {^P p_j} = {^W T_C(t)} {^C p_j} \quad (\text{Eq. 3})$$

where $^W T_P$ and $^W T_C$ are 4×4 Euclidean transformation matrices from the parent and child camera coordinate systems to the world coordinate system, respectively. From Eq. (3), it follows that:

$$^P p_j = {^W T_P(t)}^{-1} {^W T_C(t)} {^C p_j} \quad (\text{Eq. 4})$$
$$= {^P T_C(t)} {^C p_j}$$

Thus, collecting Eq. (4) for the j-th joint across time provides the homogeneous equation for $^C p_j$:

$$\begin{bmatrix} {}^P T_C(t_1) - {}^P T_C(t_2) \\ {}^P T_C(t_1) {}^P T_C(t_3) \\ \vdots \\ {}^P T_C(t_1) - {}^P T_C(t_T) \end{bmatrix} {}^C p_j = \Delta T {}^C p_j = 0. \quad \text{(Eq. 5)}$$

For a ball joint with two or three degrees of freedom, the right null vector of $\Delta T$ obtained with singular value decomposition (SVD) is a solution of $^C p_j$. $^P p_j$ can also be computed in a similar way.

To obtain the skeleton for the whole body, the (j+1)-th joint position from the parent joint in the corresponding camera coordinate system, $^J q$, can be computed for each limb as:

$$^J q = \begin{bmatrix} ^J \tilde{p}_{j+1} - ^J \tilde{p}_j \\ 1 \end{bmatrix}, \quad \text{(Eq. 6)}$$

where $\tilde{p}$ is an inhomogeneous coordinate of p and J is the joint coordinate system. In some embodiments, the skeleton estimation technique can be similar to magnetic-sensor techniques [e.g., O'Brien et al., "Automatic Joint Parameter Estimation from Magnetic Motion Capture Data," in *Proc. Graphics Interface* 2000, 53-60 (2000)].

Figure 10:
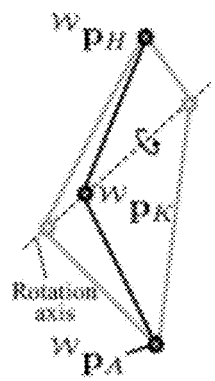
FIG. 10 illustrates a family of solutions for a case where a range-of-motion exercise lacks sufficient articulation for the joint according to an embodiment of the present invention.

Different joints can have more or fewer degrees of freedom. When a joint has three degrees of freedom (3D rotation with respect to the parent joint), the singular vector corresponding to the smallest singular value can be used to calculate a robust estimate of the joint position. When the joint has fewer than three degrees of freedom, as is the case with the knee joint (one degree of freedom), or where the range-of-motion exercise lacks sufficient articulation for the joint, Eq. (6) is underdetermined, and the singular vector leads to a family of solutions that lie on the axis of rotation. In the case of a knee joint, as shown in FIG. 10, two null vectors can be obtained from $\Delta T$, and the knee joint position in the thigh-camera coordinate system, $^{CT}p_K$, is a linear combination of the null vectors:

$$^{CT}p_K = V_K c, \quad \text{(Eq. 7)}$$

where $V_K$ is a matrix consisting of the two null vectors of $\Delta T$ and c is a 2D coefficient vector for the null vectors. To determine c, a "rest" pose in which the knee is known to be straight, can be used. The collinearity constraint can be represented as:

$$[^W p_H - ^W p_A] \times (^W p_K - ^W p_A) = 0, \quad \text{(Eq. 8)}$$

where $^W p_H$, $^W p_K$, and $^W p_A$ are the hip, knee, and ankle joint positions, and $[\ ]_x$ is the skew-symmetric representation of the cross product. This constraint enables a unique solution for the knee joint.

The skeleton can be estimated from the range of motion data and parameterized by the root position, root orientation, and joint angles. In some embodiments, the root position and orientation are taken to be coincident with the root camera (e.g., camera 710 in FIG. 7). Given this skeleton, a pose can be obtained for any time t by applying the root camera pose to the root segment directly and applying the relative orientations between pairs of cameras along a kinematic chain to the joints; in some embodiments, the positions of the camera poses for cameras other than the root camera are not used.

Eq. (1a) above considers the skeleton as a hard constraint for optimization. Forward kinematics maintains this constraint by estimating camera positions with respect to the skeleton. The Euclidean transformation from the joint coordinate system J to the world coordinate system W at time t is defined as:

$$^W p_J(t) = \begin{bmatrix} ^W R_J & ^W \tilde{p}_j(t) \\ 0 & 1 \end{bmatrix}, \quad \text{(Eq. 9)}$$

where $^W R_j$ is the orientation of the corresponding camera and $^W \tilde{p}_j$ is an inhomogeneous representation of the position of the joint j in W. The position of the child joint $^W p_{j+1}(t)$ is computed as:

$$^W p_{j+1}(t) = ^W T_J(t) ^J q, \quad \text{(Eq. 10)}$$

where $^J q$ is a vector from the parent joint to the child joint in J. This formulation allows a recursive estimation of joint positions along a kinematic chain.

Similarly, the camera center in the world coordinate system can be re-estimated as:

$$^W C_j(t) = ^W T_j(t) \begin{bmatrix} -^J \tilde{p}_j \\ 1 \end{bmatrix}, \quad \text{(Eq. 11)}$$

where $^W C_j(t)$ is a camera center attached to the j-th joint at time t in W.

While the estimate of the camera orientation from the structure-from-motion (described below) is typically accurate, the estimate of the camera position can be relatively noisy when the 3D structure is far from the camera center. Small changes in orientation can produce high image re-projection errors. In contrast, small changes in position along the focal direction do not produce high image re-projection errors if the distance from the camera center to 3D points is much longer than the noise in the position. Because the noise in the root camera center is directly transmitted to the root position, inaccuracies in the estimated pose of the root camera can result in undesired jitter of the entire skeleton. To alleviate this behavior, instead of using one camera to recover the motion of the root, several cameras can be averaged to create a virtual root camera.

Figure 11A:
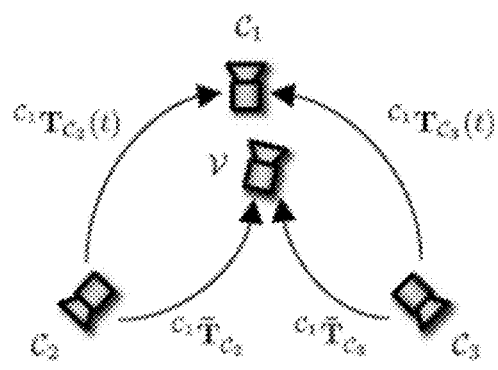
FIGS. 11A and 11B illustrate average relative transforms associated with a virtual camera according to an embodiment of the present invention.
Figure 11B:
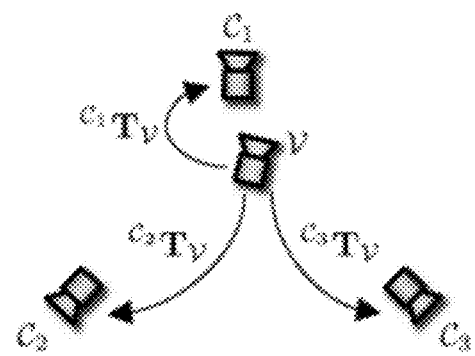

For example, in one embodiment, the subject has three cameras at positions that are approximately rigidly connected, such as a back-waist camera $C_1$, a right-waist camera $C_2$, and a left-waist camera $C_3$. One of these cameras, e.g., back-waist camera $C_1$, can be treated as the reference camera. To the extent that the cameras are not perfectly rigidly connected, average relative transforms $^{C_1}\overline{T}_{C_2}$ and $^{C_1}\overline{T}_{C_3}$, illustrated in FIG. 11A, can be estimated across time, e.g., using:

$$^{C_1}\overline{T}_{C_2} = f_a(^{C_1}T_{C_2}(1), ^{C_1}T_{C_2}(2), \ldots, ^{C_1}T_{C_2}(T)), \quad \text{(Eq. 12)}$$

where $f_a(\ )$ is a function that takes an average of the transforms. Once the average transform is estimated, the inverse of the average transform is used as a transform from a virtual camera V to the physical cameras, as illustrated in FIG. 11B, i.e.:

$$^{C_2}T_V = ^{C_1}\overline{T}_{C_2}^{-1}, \quad ^{C_3}T_V = ^{C_1}\overline{T}_{C_3}^{-1}. \quad \text{(Eq. 13)}$$

The virtual camera pose can then be obtained by taking an average of the transforms for $C_1$, $C_2$ and $C_3$.

After the transforms from virtual cameras are determined, physical cameras can be parameterized by the virtual camera pose, and this parameterization can be used when reprojection errors are computed in the optimization of Eq. (1a).

Although described with reference to a root camera, the virtual camera technique can also be applied for estimating positions of other joints. Multiple cameras can be attached to a limb section between two joints (e.g., a forearm or shin), and a robust average of the information from those cameras can be used to provide a virtual camera for the limb. In some embodiments, virtual cameras are used where occlusion occurs frequently, where more precise estimation is desired (e.g., for the root), and/or where camera registration can be difficult (e.g., around the chest due to its non-rigidity or shin due to fast motion).

Referring again to Eqs. (1a)-(1d), the optimization process for finding body poses O and A that minimize the objective function in Eq. (1a) will now be described. Conceptually, the process seeks to find a sequence of body poses of the skeleton over time that are temporally smooth and that result in low spatial errors between the projected 3D structure from the estimated cameras and the actual observed structure in the images. Initial guesses as to the body pose can be set using the registered camera poses and homographies (determined, e.g., as described above), and the Levenberg-Marquardt method or other suitable techniques can be applied to refine the initial guesses. Considering all poses over time in the optimization is computationally expensive; accordingly, some embodiments use a short time window and sequentially optimize the poses by shifting the time window.

The first term in Eq. (1b) considers the reprojection errors of the 3D points with the 2D measurements for registered cameras (including both absolute and relative registration as described above). This minimization is different from conventional bundle adjustment of SfM in that the camera poses are constrained by the skeleton. Using the projection matrix Pj(t) of the camera associated with the j-th joint (also referred to as the j-th camera), the projection function $P_j$ is defined by:

$$P_j(X_p, t, O, A) = L_j\left(\frac{P_{j:1}(t)X_p}{P_{j:3}(t)X_p}, \frac{P_{j:2}(t)X_p}{P_{j:3}(t)X_p}\right) \quad \text{(Eq. 14)}$$

where $P_{j:i}$ is the i-th row of the j-th camera projection matrix $P_j$ and $L_j(\ )$ is a function that distorts the reprojected position using a fisheye distortion parameter of the j-th camera. The projection matrix, which is made from the camera poses, is constrained by the estimated underlying skeleton.

The second term in Eq. (1b) addresses cameras that cannot be registered through absolute and relative registration described above. As described below, homographies can be determined for these cameras; in Eq. (1b) the homographies are parameterized with the joint angles, and correspondences detected in homography estimation (e.g., as described below) can be used as image measurements.

Eqs. (1c) and (1d) provide smoothness terms that represent the differences in root positions and joint angles between consecutive frames; these terms can be used to reduce the effects of jitter in the camera poses estimated from absolute and relative registration processes.

It will be appreciated that the processes and algorithms described herein for reconstructing scene geometry, the subject's skeleton, and/or skeleton pose sequences are illustrative and that variations and modifications are possible. For example, the technique described above starts with general assumptions about the subject's skeletal structure, e.g., that the subject is a human being with two arms, two legs, and a head arranged in a characteristically human configuration and limited information as to where on the skeleton various cameras are positioned (e.g., head, left hip, right forearm, etc.). In alternative embodiments, the subject's particular body dimensions and/or positions of cameras relative to the subject's joints may be measured as part of the motion-capture process (e.g., before or after performing the motion), and these parameters can be provided as inputs into the reconstruction algorithms. This may allow faster and/or more accurate reconstruction by reducing the amount of information that has to be inferred from image data. In still other embodiments, even less input information can be provided; for example, it is in principle possible to reconstruct which camera is on which limb if that information is not provided as input.

Figure 12A:
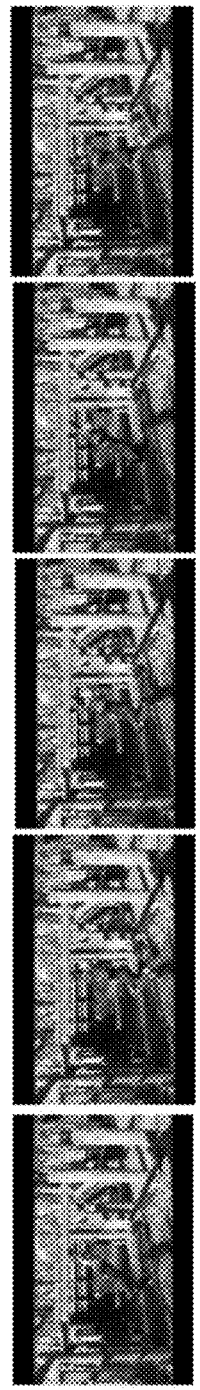
FIGS. 12A and 12B illustrate a motion capture example according to an embodiment of the present invention.
Figure 12B:
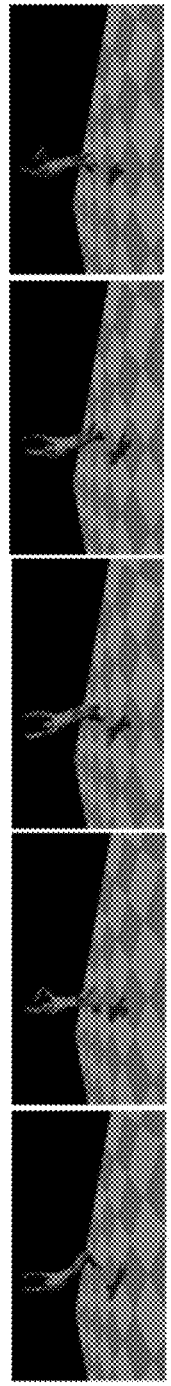
Figure 13A:
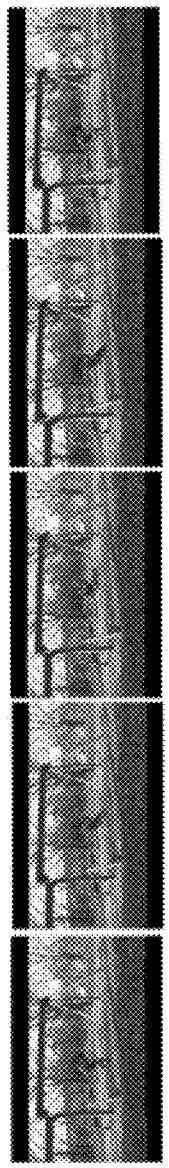
FIGS. 13A and 13B illustrate a motion capture example according to an embodiment of the present invention.
Figure 13B:
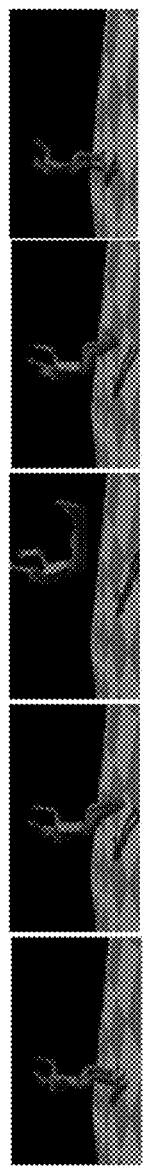

The motion capture system described above is portable and self-contained, allowing prolonged captures in outdoor environments. To test one embodiment of the system, a number of motion sequences were captured on a playground. Results are illustrated in FIGS. 12 and 13. In FIGS. 12A and 13A, a row of photos captured by an observer shows a subject performing particular motions (hanging from monkey bars in FIG. 12A, swinging on a swing in FIG. 13A) while wearing outward-looking cameras. FIGS. 12B and 13B are computer-generated images of a rendered actor performing the motions. These images were generated by using techniques described above to generate pose sequences for a skeleton, then applying a skin to the skeleton using conventional rendering techniques to produce the rendered actor. Despite the dynamic nature of the motions, which results in image blur and imprecise feature matchings, the motion reconstruction is accurate.

Figure 14:
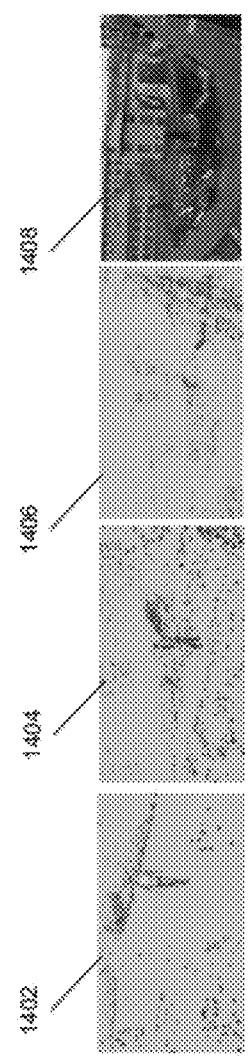
FIG. 14 illustrates reconstruction of a long walking motion along a winding path on an uneven terrain according to an embodiment of the present invention.

FIG. 14 illustrates reconstruction of a long walking motion along a winding path on uneven terrain according to an embodiment of the present invention. In this example, the subject traversed a distance that is far greater then a capture distance that would be possible in a traditional indoor motion capture setup. Images 1402, 1404, and 1406 show the reconstructed subject and the sparse 3D structure at different points along the walk. Image 1408 is a reference photo taken during the capture; the viewing angle of image 1406 has been approximately matched to this photo. One can see that the sparse structure does provide a level of context to the motion by showing the path along which the subject has walked.

The motion reconstruction achievable with a system as described herein has also been compared with a commercially available optical marker-based motion capture system (available from Vicon). For testing purposes, 19 cameras were mounted on a human subject, and three optical markers were applied on each camera. Both systems were synchronized temporally; after that, as the subject moved in an environment equipped with cameras for the marker-based system, images were collected using the body-mounted cameras while marker positions were collected using the marker-based system. Because the two systems reconstruct motion differently, to evaluate accuracy, one set of measurements was converted to space of the other. Specifically, camera poses (orientation and translation) were estimated from the three moving markers attached to the camera in {M}. Using the static markers in the scene that had already been reconstructed in the Vicon system and manually specifying the corresponding markers in the images, we were able to estimate the camera poses in {M}. From the estimated camera poses, $P_M$, and positions of three moving markers, $x_M$, the mapping function between camera poses and markers, $P_M = f_m(x_M)$, is obtained. As a result, motion in the Vicon system can be represented in terms of the camera poses in {M}.

Structure from motion provides a series of camera poses. The reconstructed camera poses in {S} that corresponded to camera poses in {M} were collected. (Again, the two coordinate systems are equal up to a similarity transform.) From the relative distance between camera centers in {S} and {M}, the scale can be recovered linearly and the iterative closest point algorithm allows an estimate of the homogeneous transform (orientation and translation) between the two point clouds of camera centers (one from motion capture and the other from structure from motion). The similarity transform can be refined nonlinearly. Once the transform is recovered, the entire camera-based reconstruction can be transformed to {M}, which leads to a consistent distant measure. Further, the mapping function $f_m$ can be refined using moving markers and the camera poses estimated by structure from motion $\hat{P}_M$. This refinement produces a $\hat{P}_M = \hat{f}_m(x_M)$ that is more accurate than $P_M = f_m(x_M)$ (i.e., camera poses reconstructed by manually specified correspondences).

For illustrative purposes, FIG. 15A shows the comparison between the camera centers estimated by Vicon markers (labeled "motion capture") and the camera centers reconstructed by the structure-from-motion algorithm described above. After applying the skeleton from each system, camera poses were refined using image re-projection from Eq. 1. Temporal smoothing terms in the refinement regularize the camera poses and result in more precise camera pose estimation, as shown FIG. 15B. The average mean error is 17 mm with a standard deviation of 12.6 mm; the maximum error is 9 cm.

Figure 16B:
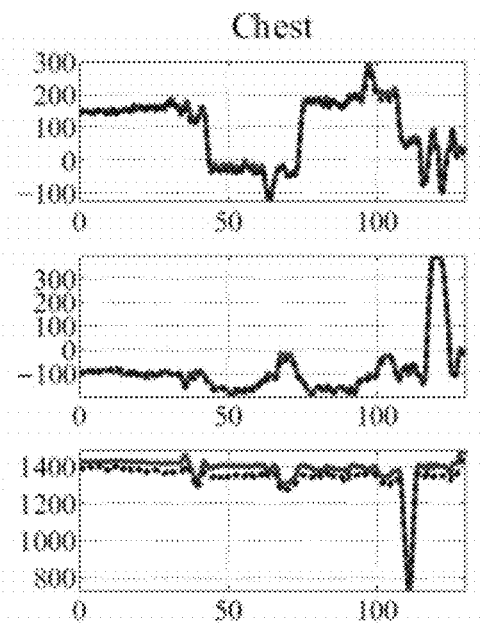
Figure 16C:
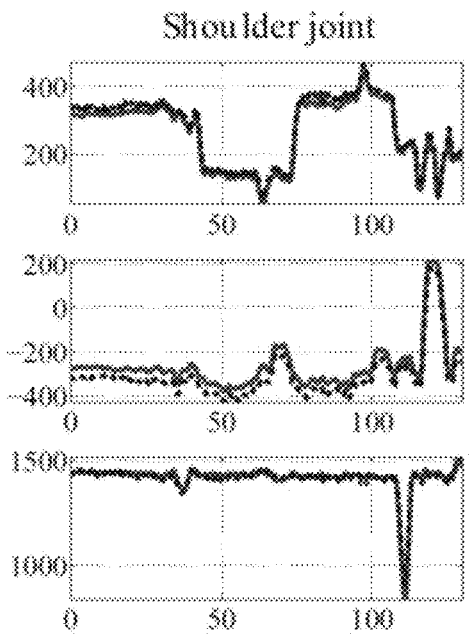
Figure 16D:
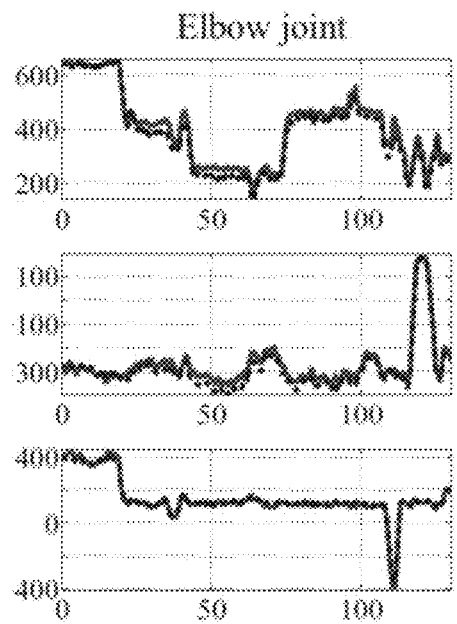
Figure 16E:
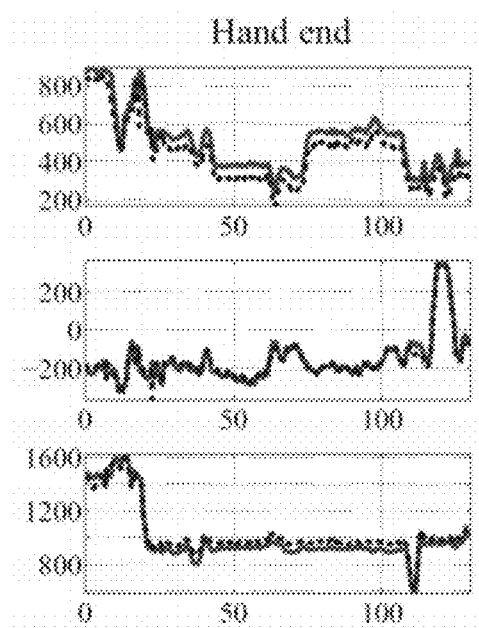
Figure 16F:
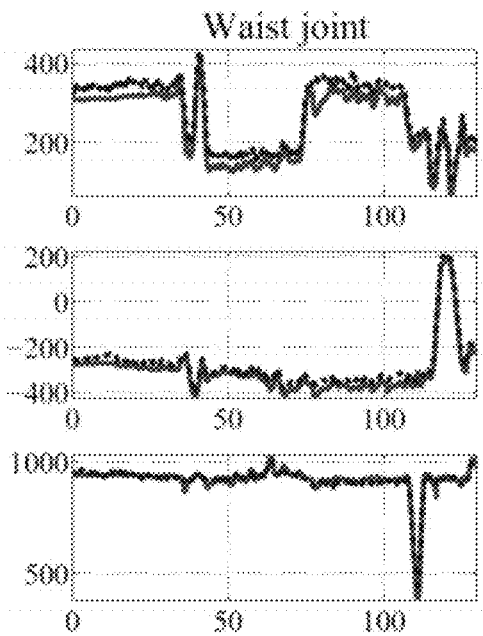
Figure 16G:
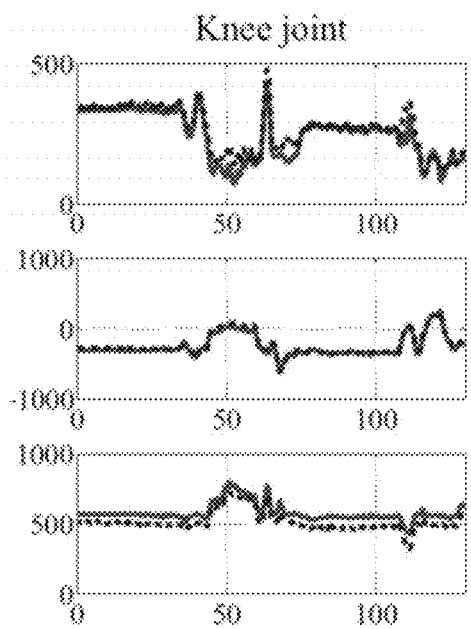
Figure 16H:
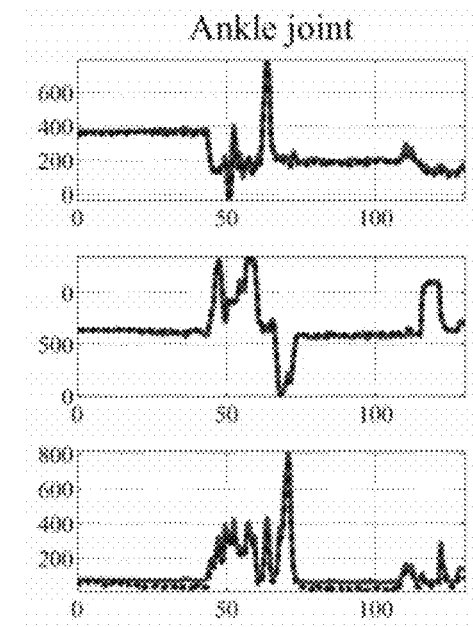
Figure 16I:
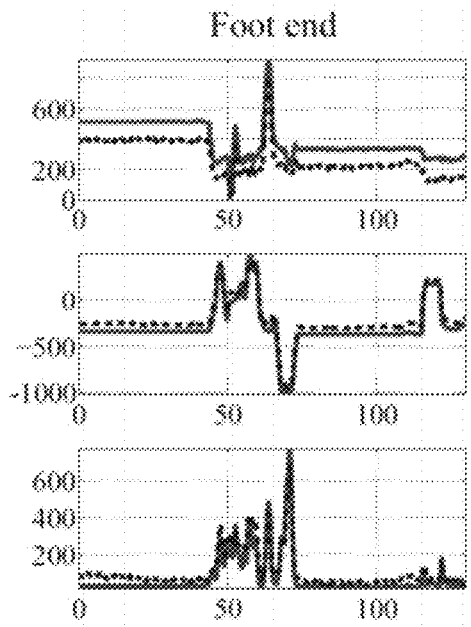

Further illustrating the comparison, FIGS. 16A-16I show the root trajectory and joint trajectories (positions as a function of time) of the skeleton in x (top plot), y (middle plot), and z (bottom plot) coordinates, for both the marker-based system and the body-mounted-camera system described above. FIG. 16A shows the root trajectory; FIG. 16B the chest, FIG. 16C a shoulder joint; FIG. 16D the elbow joint (from the same arm) and FIG. 16E the hand. For the lower body, FIG. 16F shows the waist joint, FIG. 16G the knee joint, FIG. 16H the ankle joint, and FIG. 16I the foot. While the error of a parent joint angle propagates through a child joint position, Eq. (1) allows a globally accurate estimate of joint position. The maximum error of a joint position in this example was about 10 cm.

It is to be understood that these results are intended merely as illustration of the capabilities of a motion capture system as described herein. In some instances, performance can be degraded due to various effects. For example, low light and the cropped-frame formats found in many commercially available cameras can introduce motion blur if the camera moves quickly, and blur can make it more difficult to estimate correspondences across frames. Automatic white balancing (if provided by the cameras and enabled) can also make finding correspondences challenging when lighting conditions are changing rapidly. Also, many commercially available CMOS chips employ a rolling shutter that can become noticeable in very high impact motions. However, even using simple consumer-grade cameras, the system is capable of capturing everyday motions indoors or outdoors for extended periods of time and without noticeable drift. The system can also be implemented using cameras specially adapted for image capture at high frame rates and/or where rapid movement is involved.

Embodiments of the invention thus provide systems and methods for capturing motion of a subject both indoor and outside. The system can be constructed from a number of consumer-grade video cameras attached to the subject so as to capture articulated motions of the subject's body as the subject performs an activity. The cameras can be used as active markers, with an estimate of their motion with respect to the world geometry being determined based on a structure-from-motion algorithm. Camera and skeletal motion can then be related and refined through a non-linear optimization procedure. Such systems advantageously do not require instrumentation of the environment and can easily be taken outside. They are also more stable against drift with extended use than existing IMU-based systems, particularly where reference images are incorporated into the processing. Further, the system can provide sparse 3D reconstruction of the environment (or world) for contextual replay or scene creation. It should be noted that as cameras continue to shrink in size and improve in quality, the possibilities for embedding cameras in clothing or otherwise unobtrusively attaching them to a subject will only increase.

While the invention has been described with respect to specific embodiments, one skilled in the art will recognize that numerous modifications are possible. For example, the particular algorithms described herein for skeleton estimation, camera registration and 3D reconstruction of the environment, and estimation of joint position and angle can all be varied. The number and type of cameras used can be varied, and different types of cameras can be used in combination. Further, in some embodiments, a subject may wear additional sensors (e.g., inertial motion sensors) along with the cameras; the sensor data can be time-correlated with the images to facilitate determining relative positions of joints and body members, with the image data providing additional information about absolute position or movement.

In some embodiments, additional enhancements can be provided to facilitate 3D scene reconstruction. For example, objects may be deliberately placed in the environment near the area where the subject will be moving, in order to provide clear reference markers for correlating images. These marker objects can be simple and inexpensive items (e.g., cones, poles or stakes having distinctive colors or patterns). In other embodiments, 3D models of the environment from other sources can be incorporated into the scene reconstruction. For example, city-scale 3D geometric models are starting to emerge as faster structure-from-motion implementations are introduced. Such large scale models can be used in some embodiments of the present invention, e.g., to contextualize long-term motions or to compose motions of multiple subjects in a single geometrically coherent environment. Further, a motion-capture subject can wear or carry a GPS sensor or similar device in addition to the body-mounted cameras; the subject's location can then be matched to a geometric model to facilitate scene reconstruction and subsequent determination of camera poses and body position.

Some embodiments may provide "hybrid" systems that use both body-mounted cameras and other sensors, with the other sensors' signals being time-correlated with the body-mounted camera images. In some embodiments, the sensors other than the body-mounted cameras can be used to determine the subject's location within the environment (an "absolute" location), and the body-mounted cameras can be used to determine the pose. A variety of sensor technologies can be used. For example, radio sensors in the environment can detect a signal emitted by a transmitter worn by the subject; signals detected by different sensors can be triangulated to determine the subject's location. Conversely, the subject may wear a radio receiver that detects signals from radio transmitters in the environment, allowing the subject's location to be triangulated based on the detected signals. A number of different sensor technologies can be used, such as a GPS sensor worn by the subject or short-range sensor systems based on technologies such as Bluetooth LE or Wi-Fi. Further, the sensors need not be radio sensors; ultrasonic sensors, visual sensors, inertial navigation sensors, or the like can also be used.

Thus, although the invention has been described with respect to specific embodiments, it will be appreciated that the invention is intended to cover all modifications and equivalents within the scope of the following claims.

What is claimed is:

1. A method for capturing motion of a subject having a body with a plurality of articulating members movable about a plurality of joints, the method comprising:
attaching a plurality of cameras to the body of the subject, wherein at least some of the cameras are attached to the articulating members and oriented toward an external environment surrounding the subject;
recording an image sequence from each of the cameras while the subject performs an action;

analyzing, using a computer system, the image sequences recorded by each of the cameras, including images of the external environment from the cameras attached to the articulating members, to determine correlations between the images; and based at least in part on the analysis of the image sequences, including the images of the external environment from the cameras attached to the articulating members, computing, using the computer system, a sequence of articulated poses of the body of the subject, the sequence of articulated poses being representative of the action.

2. The method of claim 1 further comprising:
rendering a computer-generated animation of an actor performing the action based at least in part on the computed sequence of articulated poses of the body of the subject.

3. The method of claim 1 wherein the external environment includes a plurality of objects that remain stationary while the subject performs the action.

4. The method of claim 3 wherein analyzing the image sequences includes generating a representation of three-dimensional scene geometry based on correlating visual features across multiple ones of the images in the recorded image sequences.

5. The method of claim 1 wherein analyzing the image sequences includes:
obtaining a model of three-dimensional scene geometry for the external environment from a source other than the recorded image sequences; and
using the model of the three-dimensional scene geometry to facilitate determination of correlations between the images.

6. The method of claim 1 wherein at least one of the cameras is a visible-light camera with a field of view subtending an angle of at least 150 degrees.

7. The method of claim 1 wherein each of the cameras has a field of view such that the fields of view of at least some of the cameras overlap when the subject's body is in a resting position.

8. The method of claim 1 wherein the action performed by the subject includes performing a series of training motions during which different joints of the body of the subject are moved through a full range of motion.

9. The method of claim 1 further comprising:
recording a plurality of reference images of the external environment,
wherein analyzing the image sequences recorded by each of the cameras includes analyzing the reference images.

10. The method of claim 9 wherein at least one of the plurality of reference images is recorded using a camera that is not attached to the body of the subject.

11. The method of claim 1 wherein attaching the plurality of cameras includes attaching at least one camera to an article of clothing to be worn by the subject.

12. The method of claim 1 wherein attaching the plurality of cameras includes attaching at least one camera to the subject using a strap.

13. The method of claim 1 wherein computing the sequence of articulated poses includes defining a root for the body and determining a position of at least one of the plurality of joints relative to the root.

14. The method of claim 13 wherein computing the sequence of articulated poses further includes determining an absolute position and orientation for the root within the external environment.

15. A system for capturing motion of a subject having a body with a plurality of articulating members, the system comprising:
a data input port configured to receive a plurality of image sequences captured by a plurality of cameras worn by a subject while performing an action, wherein at least some of the cameras are attached to the articulating members of the body of the subject and oriented toward an external environment surrounding the subject; and
a processor configured to:
analyze the image sequences received from each of the plurality of cameras, including images of the external environment received from the cameras attached to the articulating members of the body, to determine correlations between the images; and
compute, based at least in part on the analysis of the image sequences, including the images of the external environment, a sequence of articulated poses of the body of the subject, the sequence of articulated poses being representative of the action.

16. The system of claim 15 wherein the processor is further configured such that computing the sequence of articulated poses includes:
applying a structure-from-motion algorithm to the image sequences to determine a geometric representation of a three-dimensional scene and an initial estimate of camera poses; and
applying a reprojection optimization to refine the initial estimate of the camera poses.

17. The system of claim 16 wherein the processor is further configured such that computing the sequence of articulated poses further includes:
computing a skeleton based on images from the image sequence associated with a range-of-motion exercise performed by the subject.

18. A system for capturing motion of a subject having a body with a plurality of articulating members, the system comprising:
a plurality of cameras adapted to be wearable by a subject while performing an activity, the plurality of cameras including at least two cameras wearable on the articulating members of the body of the subject and orientable toward an external environment surrounding the subject;
a storage medium configured to receive and store a plurality of image sequences captured by the plurality of cameras, the image sequences including images of the external environment captured while the subject performed the activity; and
a processor coupled to the storage medium and configured to:
analyze the image sequences including the images of the external environment to determine correlations between the images; and
compute, based at least in part on the analysis of the image sequences, including the images of the external environment, a sequence of articulated poses of the body of the subject, the sequence of articulated poses being representative of the action.

19. The system of claim 18 wherein the cameras are operable to capture images at a rate of at least 60 frames per second.

20. The system of claim 18 wherein at least one of the cameras is a visible-light camera with a field of view subtending an angle of at least 150 degrees.

* * * * *